United States Patent [19]

Kucharski

[11] Patent Number: 5,558,208
[45] Date of Patent: Sep. 24, 1996

[54] CONVEYOR BELTS WITH SPIRAL OVERLAY

[75] Inventor: John G. Kucharski, Winchester, Va.

[73] Assignee: Ashworth Brothers, Inc., Winchester, Va.

[21] Appl. No.: 434,993

[22] Filed: May 4, 1995

Related U.S. Application Data

[62] Division of Ser. No. 115,735, Sep. 3, 1993, Pat. No. 5,423, 416.

[51] Int. Cl.$^6$ .................................................. B65G 15/54
[52] U.S. Cl. ........................................... 198/848; 198/778
[58] Field of Search ................................... 198/778, 831, 198/848

[56] References Cited

U.S. PATENT DOCUMENTS

| | | |
|---|---|---|
| 142,272 | 8/1873 | Powers . |
| 490,608 | 1/1893 | Hutchinson . |
| 538,443 | 4/1895 | Ferguson . |
| 1,243,352 | 10/1917 | Snedeker . |
| 1,498,236 | 6/1924 | Crane . |
| 1,861,840 | 6/1932 | Claghorn ................................. 198/834 |
| 1,895,344 | 2/1932 | Pink . |
| 1,961,317 | 2/1934 | Werme et al. . |
| 1,984,826 | 12/1934 | Bunker . |
| 2,025,620 | 12/1935 | Sneesby ................................. 198/690.2 |
| 2,234,537 | 3/1941 | Blackburn . |
| 2,278,361 | 3/1942 | Rapisarda . |
| 2,628,706 | 2/1953 | Guba . |
| 2,734,283 | 2/1956 | Greer . |
| 2,855,091 | 10/1958 | Frandsen . |
| 3,055,488 | 9/1962 | Stone . |
| 3,920,117 | 11/1975 | Roinestad . |
| 4,078,655 | 3/1978 | Roinestad . |
| 4,742,907 | 5/1988 | Palmaer ................................. 198/831 |
| 4,867,301 | 9/1989 | Roinestad et al. . |
| 4,878,362 | 11/1989 | Tyree, Jr. . |
| 4,893,710 | 1/1990 | Bailey et al. ........................... 198/853 |
| 4,901,844 | 2/1990 | Palmaer et al. ........................ 198/778 |
| 4,934,517 | 6/1990 | Lapeyre ................................. 198/852 |
| 4,940,133 | 7/1990 | Roinestad et al. ................... 198/831 X |
| 4,951,807 | 8/1990 | Roinestad et al. ..................... 198/778 |
| 4,953,693 | 9/1990 | Draebel ................................. 198/852 |
| 4,957,597 | 9/1990 | Irwin ..................................... 198/831 |
| 4,972,942 | 11/1990 | Faulkner ............................... 198/853 |
| 4,989,723 | 2/1991 | Bode et al. ........................ 198/853 X |

(List continued on next page.)

FOREIGN PATENT DOCUMENTS

WO92/050960 2/1992 WIPO .

OTHER PUBLICATIONS

Jonge Poerink Borne Brochure, Woven Wire Belts, Conveyors, Woven Wire Screens (Date Unknown).
BHS–Torin, Inc. Brochure, CNC Camless Spring Coilers (Date Unknown).
Simplex Rapid, Automatic Coiler Brochure (Date Unknown).
Automated Industrial Motion, Wire Former/Spring Coilers, Published 1987.
Ashworth Brothers, Inc. Publication, Chain Driver Belts, published 1992.
Product Catalog excerpt, pp. 10–11, date unknown, source unknown.
Cambridge Conveyor Belts Catalog, pp. 62, 64, 94, and 95, 1941.

*Primary Examiner*—James R. Bidwell
*Attorney, Agent, or Firm*—Banner & Allegretti, Ltd.

[57] ABSTRACT

A spiral overlay having multiple variations, but generically, comprised of wire spirals intermeshed together by connecting rods extending across the conveyor in the transverse direction. Broadly, a first overlay is made up of spirals which may be tapered and afford pitch control by incorporating elongated loops in the spirals to limit the movement of the rods therein. The elongated loops also provide for collapsibility of the spirals relative to one another. A second overlay is made of integral or modular spirals such that the overlay includes upstanding spiral elements on its conveying surface to provide traction and separation of the articles being conveyed.

20 Claims, 28 Drawing Sheets

U.S. PATENT DOCUMENTS

| | | | |
|---|---|---|---|
| 4,993,544 | 2/1991 | Bailey et al. | 198/853 X |
| 5,031,757 | 7/1991 | Draebel et al. | 198/852 |
| 5,083,659 | 1/1992 | Bode et al. | 198/853 |
| 5,131,526 | 7/1992 | Kaak | 198/778 |
| 5,174,439 | 12/1992 | Spangler et al. | 198/853 |
| 5,181,601 | 1/1993 | Palmaer et al. | 198/831 |
| 5,217,110 | 6/1993 | Spangler et al. | 198/852 |
| 5,224,583 | 7/1993 | Palmaer et al. | 198/852 X |

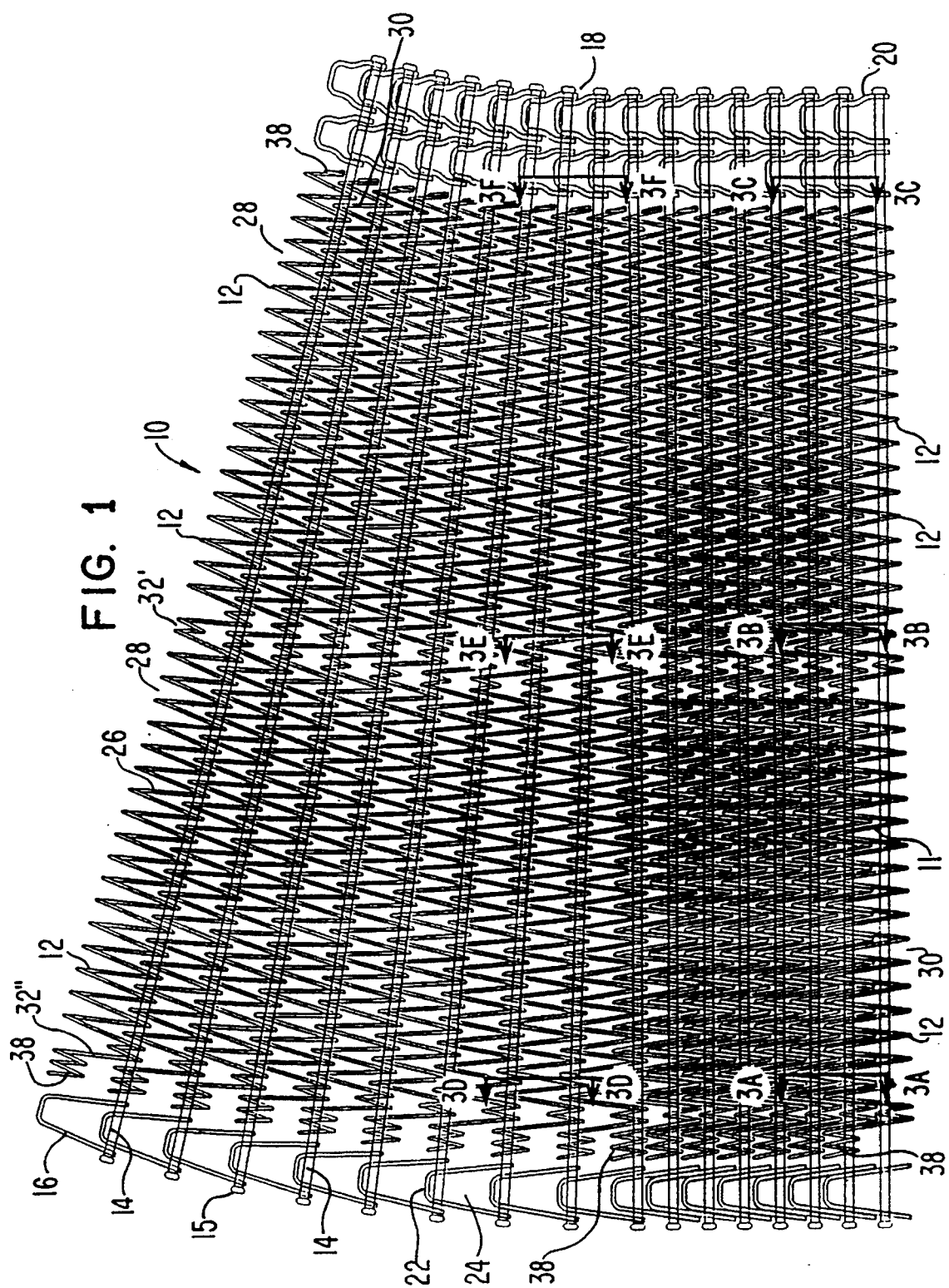

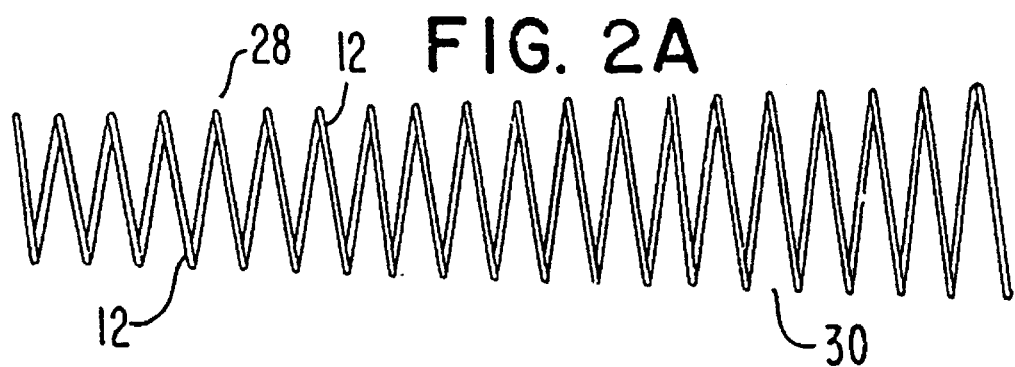
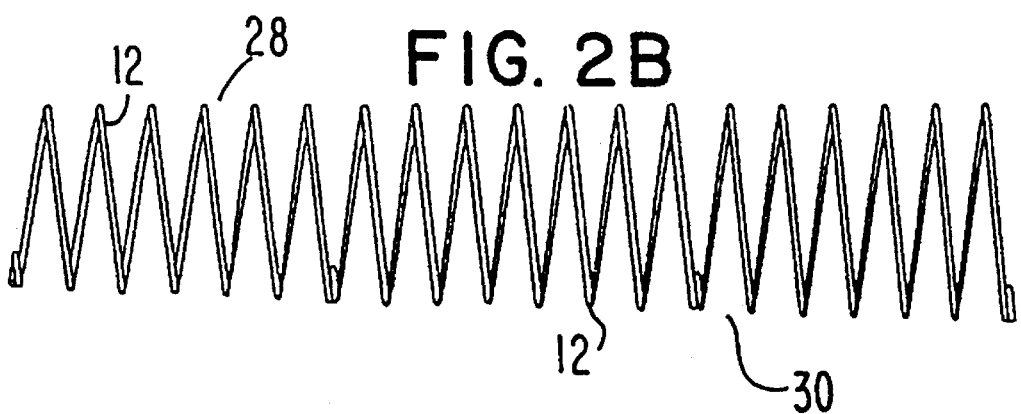
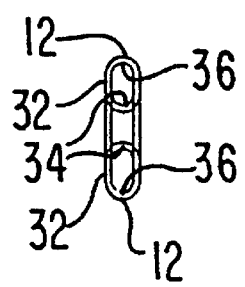
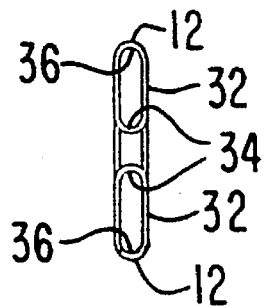

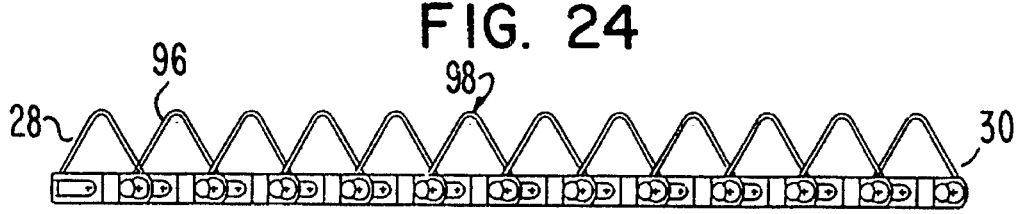
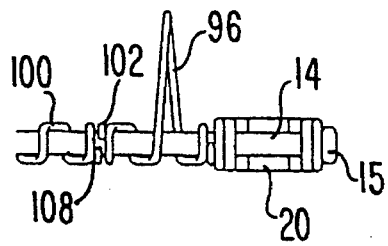
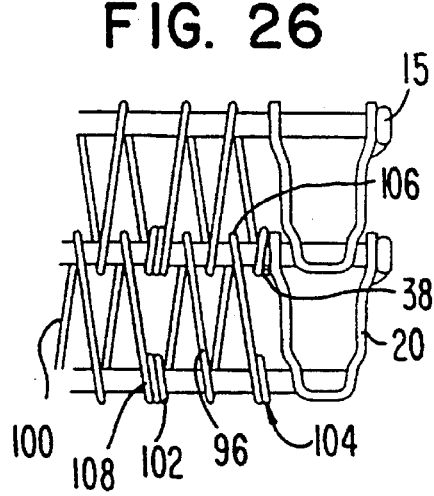
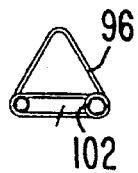
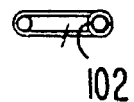

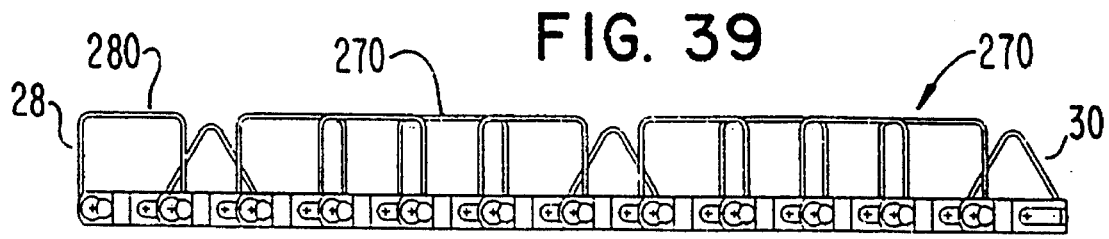
FIG. 39
FIG. 40
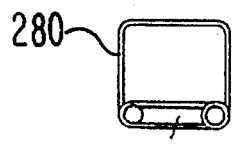
FIG. 42
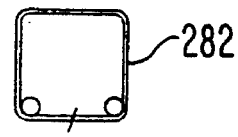
FIG. 41
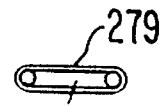
FIG. 43
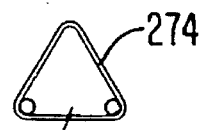

FIG. 72
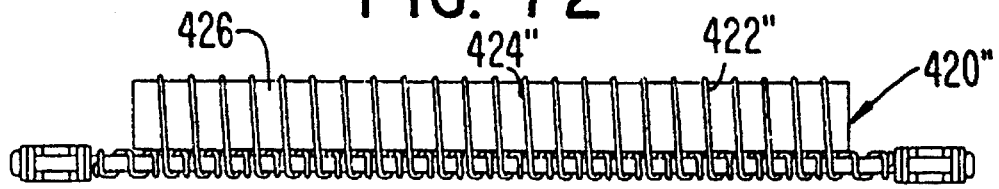
FIG. 73
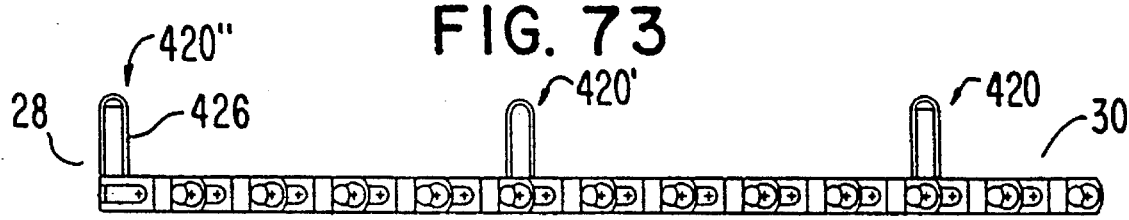
FIG. 74 FIG. 75
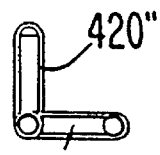 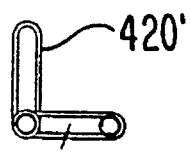

CONVEYOR BELTS WITH SPIRAL OVERLAY

This application is a divisional of application Ser. No. 08/115,735, filed Sep. 3, 1993, now U.S. Pat. No. 5,423,416.

FIELD OF THE INVENTION

The present invention relates to conveyor belts and to an overlay which forms a support surface for conveyor belts, particularly an overlay comprised of integral or modular wire spirals forming various lift, edge guard and lane divider elements interconnected together by a system of connecting rods and connective links.

BACKGROUND OF THE INVENTION

Wire conveyor belt systems are widely used in a great variety of industrial fields. A wire mesh overlay generally comprises the support surface of a wire conveyor belt, with the mesh overlay being formed of wire spirals intermeshed together by connecting rods which extend transversely across the width of the belt. Typically spiral overlays are comprised of interconnected flat spirals intermeshed and connected to one another by the rods. The ends of the rods are inserted into connective links which may also serve as tractive links around a sprocket wheel.

One of the problems associated with a conventional spiral overlay is that generally the spirals have been designed without any provision for controlling the pitch of the spirals as the overlay winds around the sprocket wheel or around a turning section of the conveyor. The pitch is defined to be the distance between adjacent rods of a conveyor overlay. In operation, the pitch decreases when traversing a sprocket wheel on a straight run of a conveyor, and the pitch will vary along the width of the overlay as an overlay winds around a turning section or curve of the conveyor. Varying pitch is also experienced in the transition section of a conveyor between a straight run and curved portion. Whenever the pitch varies, however, without significant pitch control, adjacent spirals bunch up and causes the leading edge of one spiral to be vertically displaced from the trailing edge of an adjacent spiral. This displacement results in rippling of the overlay and misalignment of the spirals, and can lead to permanent distortion if the spirals are subject to bending and twisting stresses beyond their elastic limit.

U.S. Pat. No. 3,920,117 to Roinestad and U.S. Pat. No. 4,878,362 to Tyree, Jr. exemplify previous attempts to provide some measure of pitch control to spiral overlays. Both the Roinestad and Tyree patents provide spirals having upward indentations on their undersides to contain the rods in bent wire portions. Although the indentations may prevent some displacement of the rods toward each other, the bent wire portions do not provide as positive a pitch control as the elongated loops of the present invention which completely contain the rods therein and completely prevent the rods from touching each other. In contrast, the bent wire portions of the prior art spirals do not prevent the rods from touching each other entirely, especially in jam situations, the bending and twisting forces in the belt would still cause the rods to travel together and result in all loss of pitch control. Furthermore, forming indentations on each turn on the underside of the spiral is costly, difficult and involves more manufacturing steps, especially when using high tensile wire.

Another problem associated with the use of a conventional spiral overlay is that generally no provision is made to prevent conveyed items from slipping on the support surface while the overlay traverses inclined portions of the conveyor. Prior attempts at solving the problem typically involved an additional manufacturing step. One of the ways was to fasten clips onto a completed overlay by crimping or welding. Another way was to rigidly attach solid bars or plates which traverse the overlay using screws. Extra attachment steps such as these result in higher cost and lower efficiency. Thus, there has been a need for an economical way of providing lift elements for added traction on the conveying surface of the overlay to prevent conveyed items from falling down an inclined section and bunching up on one portion of the overlays.

In addition, when conveying small articles or articles that move about easily, there has been a need to provide edge guards along the side edges of the overlay in order to prevent the items from falling off of the conveyor altogether. Edge guards have also been provided in the past by rigidly securing plates to the overlay which also involved the extra step of attachment during manufacture. For articles which are measured or separated prior to loading onto the conveyor, there has been a need to divide the support surface of the overlay into pockets to contain and convey premeasured quantities of articles or separated articles.

SUMMARY OF THE INVENTION

Accordingly, the present invention provides a conveyor belt and a wire spiral overlay for a conveyor belt which overcomes many of the problems associated with the prior art.

The present invention pertains to a spiral overlay having multiple variations, but generically, a spiral overlay is comprised of wire spirals intermeshed together by connecting rods extending across the conveyor in the transverse direction. The ends of the rods are connected to connective links which pivotally connect adjacent rods, and are arranged along the side edges of the conveyor. The links also serve as tractive links, that is, they can engage the sprocket wheels which drive the conveyor. The links may also be made of wire similar to the wire spirals of the overlay. The spirals may incorporate tight coils or "pigtails" which receive the ends of the rods.

The spirals may be simple flattened helixes with linking bends which intermesh with corresponding linking bends of adjacent spirals. The simple flattened helix shape of the spirals provide collapsibility of spirals connected by a rod, relative to one another. Allowing for collapsibility ensures that any variation in the pitch of the conveyor, such as at a curved section or near the sprocket wheel, is accommodated by the ability of the spirals to move relative to one another, especially those spirals operatively connected to a single rod.

The first category of spirals of the present invention incorporate elongate loops between the opposed linking bends across the spiral for engagement to the rods of the conveyor. The elongate loops contain the rods in a manner that affords pitch control as the overlay winds around the sprocket wheel or a turning section. The spiral may be straight, that is of even width, for a straight-run conveyor in which case the elongate loops will be of constant width. Alternatively, the spiral may be tapered on one or both sides and incorporate double loops along its length or single loops along one side. The widths of the loops on a tapered spiral varies with the amount of taper, and the spiral may be tapered for a fixed turn conveyor. The widths of the elongate loops also determines the collapsibility of the spirals on the rods. In either the tapered or non-tapered spiral, the loops may be multiple loop coils for added strength.

The spiral overlay constructed in the manner of this invention has pitch control which prevents the spirals from bunching up and prevents substantial vertical displacement of a leading edge of one spiral from the trailing edge of an adjacent spiral. The overlay of the present invention avoids the rippling and misalignment problems of the prior conveyors.

As will be appreciated by those skilled in the art, any number of coils or loops may be incorporated into the spirals to receive the rods, and the shape of the loops or coils determines some important characteristics of the finished overlay. Circular loops or coils will fix the position of the connecting rod on the spiral, whereas elongate loops will allow the rod to move within the loop, and thereby accommodate some movement of adjacent spirals relative to one another. The widths of the elongate loops determine the range of motion of the rod within the loop. Therefore, for straight runs, circular loops may be desired in order to fix the positions of the rods relative to one another, and thereby prevent the spirals from bunching up. Alternatively, loops of fixed width can be provided to allow control collapse around a sprocket. On the other hand, for turning sections or curves, elongate loops may be desired in order to allow the rods to vary their positions relative to one another to accommodate the spirals which will tend to flex and collapse into one another. Providing elongated loops which are integrally formed with the spiral as in the present invention is simpler, more efficient and economical than the prior art methods.

The second category of spirals include those with either modular or integrally formed lift or divider elements. The lift or divider may comprise the upstanding legs of a triangle, polygon or oblong element formed of wire and positioned along the spiral. Another use of an upstanding element is along the side edges of the overlay to provide edge guards for preventing articles from falling off of the overlay. Similar elements located between the side edges of the overlay can act as lane dividers to separate articles being conveyed for measuring purposes or ease of assembly. The upstanding elements themselves may incorporate additional circular loops for insertion of additional rods or plates to increase strength. The lift or divider elements provide traction to prevent excess movement of articles relative to the movement of the overlay and provide separation of articles where desired.

The spirals are arranged relative to one another so that their linking bends are intermeshed with those of an immediately adjacent spiral. Connecting rods operatively connect pairs of adjacent spirals. Adjacent rods are connected by the connective links arranged along the side edges of the overlay. The connective links are generally U-shaped and are arranged such that the closed part of one link rests within the open part of an adjacent link. The connecting rods pivotally interconnect the links through holes or slots on the legs of the U-shaped. Each link receives two rods, one near the closed part and the other near the open part. The connective links may alternatively be formed of wire similar to the spirals, or of flat plates and be connected in the same way as the U-shaped links.

The advantages of forming lift or divider elements from the wire of the spiral include simplicity of manufacture since it minimizes further attachment of plates or bars after initial assembly of the rods and spirals. Another feature of the present invention is the flexibility and versatility available since integral spirals may be shaped and located in different orientations, and may be assembled with lift rods, bars and the like in various locations to obtain an overlay which is best suited to the intended use. In addition, forming lift or divider elements from the same wire as the spiral results in an overlay which is lighter and uses less material than the conventional overlays with plates attached, thereby lowering costs. Another economical advantage concerns the elimination of tooling costs since changes in the shapes of the spirals are achieved by adapting the programming of the forming machine. In conventional overlays the formation of lifts, dividers or edge guards by attaching plates to the overlay involved tooling costs to facilitate attachment of the plates to the overlay. The present invention does away with these additional costs.

It is contemplated that spirals having upstanding elements could be tapered also, with the upstanding elements proportionately sized according to its location along the transverse width of the conveyor.

These and other features and advantages of the invention may be more completely understood from the following detailed description of the preferred embodiments of the invention with reference to the accompanying drawings.

BRIEF DESCRIPTION OF THE DRAWINGS

FIG. 1 is a top plan view of a spiral overlay section in accordance with a first preferred embodiment of the present invention.

FIG. 2A is a top plan view of a portion of a double tapered spiral.

FIG. 2B is a top plan view of a portion of a single tapered spiral.

FIG. 2C is an end view of one end of a single spiral of the overlay of FIG. 1.

FIG. 2D is an end view of the other end of a single spiral of the overlay of FIG. 1.

FIG. 24 is a side elevational view of the overlay of FIG. 22.

FIG. 25 is a detailed front elevational view of one side of the overlay of FIG. 22.

FIG. 26 is a detailed top plan view of one side of the overlay of FIG. 22.

FIG. 27 is a cross-section of the overlay taken along line 27—27 of FIG. 22.

FIG. 28 is a cross-section of the overlay taken along line 28—28 of FIG. 22.

FIG. 29 is a cross-section of the overlay taken along line 29—29 of FIG. 22.

FIG. 39 is a side elevational view of the overlay of FIG. 36.

FIG. 40 is a cross-section of the overlay taken along line 40—40 of FIG. 36.

FIG. 41 is a cross-section of the overlay taken along line 41—41 of FIG. 36.

FIG. 42 is a cross-section of the overlay taken along line 42—42 of FIG. 36.

FIG. 43 is a cross-section of the overlay taken along line 43—43 of FIG. 36.

FIG. 72 is a cross-section of the overlay taken along line 72—72 of FIG. 69.

FIG. 73 is a side elevational view of the overlay of FIG. 69.

FIG. 74 is a cross-section of the overlay taken along line 74—74 of FIG. 69.

FIG. 75 is a cross-section of the overlay taken along line 75—75 of FIG. 69.

DETAILED DESCRIPTION OF THE PREFERRED EMBODIMENTS

Figure 3A:
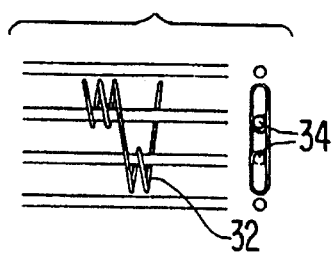
FIG. 3A is a top plan view and cross section of the spiral section taken along line 3A—3A of FIG. 1.

Referring to FIGS. 1–4, a spiral overlay section 10 connected to a section of a conveyor belt is depicted according to a first preferred embodiment of the present invention. The overlay section 10 will be referred to as the overlay for simplicity. The spirals of overlay 10 are preferably formed of high tensile metal wire, such as stainless steel wire. Examples of wire that can be used include ANSI Type 304 stainless steel, 0.047 inch diameter, 18 gauge, 267/295 KPSI tensile strength, and 0.062 inch, 16 gauge 258/285 KPSI tensile strength. The wire is bent to form overlay 10 in such a manner that a plurality of flat sections 11 extend generally in the lengthwise direction of the conveyor belt and are joined by opposed arcuate linking bends 12. A spiral 26 is thus formed of flat sections 11 and linking bends 12 formed integrally into a generally flat helix that extends across the width of the belt.

Overlay 10 of FIG. 1 is for a conveyor belt designed to travel around curves and turns in a single direction, and is made up of tapered spirals having their linking bends 12 intermeshed and operatively connected by connecting rods 14 which extend across the conveyor in the transverse direction. Tapered spirals refers to the variance in length of each spiral across the width of the belt. Along the side edges, outside edge 16 and inside edge 18 of the overlay, connective links 20 are arranged, in a nested relationship to one another, extending in the longitudinal direction. Links 20 receive the ends of rods 14 to thereby pivotally interconnect the rods of overlay 10.

Figure 4B:
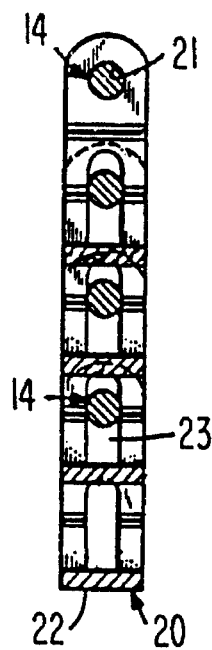
FIG. 4B is a cross-section of the links taken along line 4B—4B of FIG. 4A.
Figure 4A:
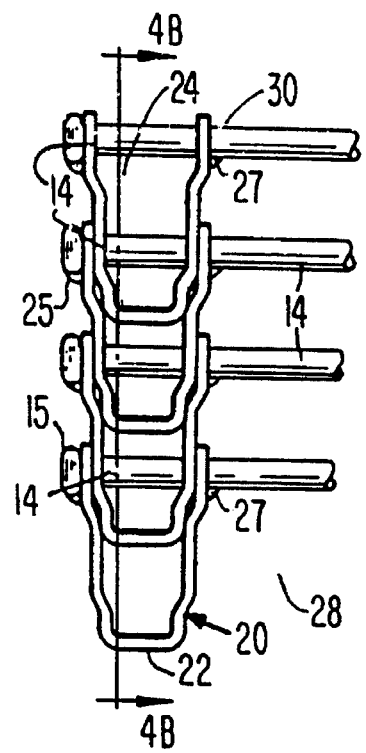
FIG. 4A is a detailed top plan view of a series of connective links of a partially assembled spiral overlay.
Figure 4C:
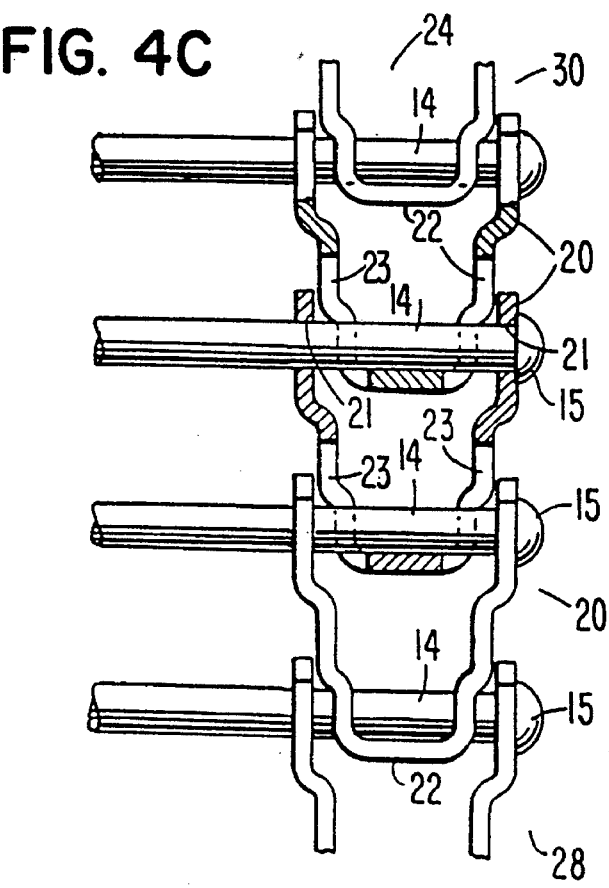
FIG. 4C is a partial cross-section of the links of FIG. 4A.

As seen in detail in FIGS. 4A–4C, links 20 are generally U-shaped with a closed side 22 and an open side 24, and a generally circular aperture 21 forming a bearing surface on each leg of the link near the open side 24. Opposed slots 23, forming bearing surfaces, are disposed near the closed side 22, such that each rod 14 is pivotally retained in the circular apertures of one link 20 and the slots of an adjacent link. All of the links 20 are longitudinally expandable and collapsible by virtue of the slots within which rods 14 may freely pivot and move relative to one another, such that the overlay 10 is vertically flexible to pass vertically around suitable end pulleys or sprocket wheels. The ends of rods 14 are finished with buttonheads 15, and to maintain the rods in the links the rods may be fixed relative to the circular apertures 21 by a weld 25 toward the exterior of the link, and a weld 27 toward the interior of the overlay. Welds 25 and 27 do not affect the movement of the rods in slots 23 however. A conveyor belt of a desired length is formed by assembly rods 14, links 20 and overlay 10. Overlay 10 can be used with belts of the type disclosed in U.S. Pat. Nos. 3,920,1170; 4,078,655 and 4,940,133, the disclosures of which are hereby incorporated by reference. Alternatively, flat plate links of the type disclosed in FIGS. 6–8 of U.S. Pat. No. 4,078,655 and referred to with reference numerals 78 and 80 may be used in place of U-shaped links 20.

Overlay 10 is comprised of tapered spirals 26. Each spiral 26 has a double taper, meaning that both the leading edge 28 and trailing edge 30 are tapered when viewed in plan view. FIGS. 2A and 2B illustrate short sections of spirals having a double and single taper respectively. The spirals in FIGS. 2A and 2B do not represent spiral 26 of FIG. 1, but are included to simply illustrate types of tapers. In both tapered spirals, the width of the spiral increases from one end across to the other end. The taper of the spiral closely conforms to the maximum separation between adjacent rods. The leading edge 28 and the trailing edge 30 of a double taper spiral as in FIG. 2A are tapered across the width of the spiral. In contrast, a single taper spiral as in FIG. 2B has a leading edge 28 which is tapered, a trailing edge 30 which is straight across the width of the spiral. The choice between double taper or single taper spirals would depend upon variables such as the curvature of the overlay section and the amount of collapsibility desired between the rods.

The end views of spiral 26, of the overlay of FIG. 1, are shown in FIGS. 2C and 2D, with FIG. 2C illustrating the wider end and FIG. 2D illustrating the shorter end. Incorporated within the flattened helical structure of spiral 26 are elongated loops 32 which are preferably arranged in opposed relationship along a single section of linking bends, i.e., at opposite end of a single flat section 11. The lengths of elongated loops 32 determine the distance through which the rods 14 can move, thereby providing pitch control to the overlay. Elongated loops 32 preferably are proportionally sized along the tapering length of spiral 26 to accommodate the curve of the conveyor. Although spirals 26 of FIG. 1 have two sets of opposed elongate loops 32, one central set indicated as 32', and a set at the outer side indicated as 32", many variations on the positioning of the loops are possible. For instance, each and every linking bend may incorporate an elongated loop, the linking bends adjacent the inner side of the belt may also have elongated loops, only linking bends at the ends of the spiral may include elongated loops, or the elongated loops may be spaced apart and not on a single section of linking bends. For example, the spiral of FIG. 2B has pigtail loops only along the trailing edge of every sixth bend.

Figure 3B:
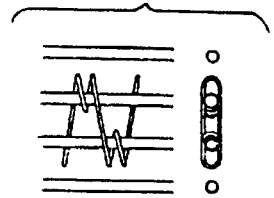
FIG. 3B is a top plan view and cross section of the spiral section taken along line 3B—3B of FIG. 1.
Figure 3C:
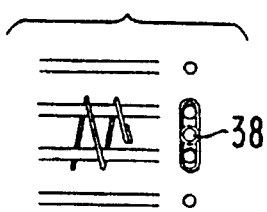
FIG. 3C is a top plan view and cross section of the spiral section taken along line 3C—3C of FIG. 1 with the connective links removed.
Figure 3D:
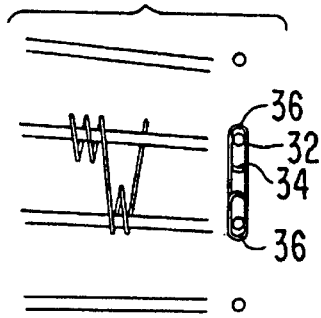
FIG. 3D is a top plan view and cross section of the spiral section taken along line 3D—3D of FIG. 1.
Figure 3E:
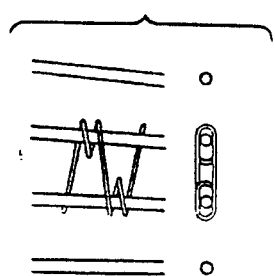
FIG. 3E is a top plan view and cross section of the spiral section taken along line 3E—3E of FIG. 1.

Pitch control that is provided by elongated loops 32 is illustrated in FIGS. 3A–3F in which adjacent rods 14 are shown with a section of a spiral 26 operatively connecting the rods. The exemplary belt in FIG. 1 and FIGS. 3A–3G is designed to function as a space-saver belt where the inside edge 18 of the belt is prevented from collapsing, as disclosed in U.S. Pat. No. 4,940,133. In FIGS. 3A–3C, the belt is shown proceeding in a straight line direction when rods 14 are parallel to one another and all at the same first pitch. In FIGS. 3D–3E, the belt is shown proceeding around a lateral curve. In this type of belt, the inside edge 18 of the belt remains at the same first pitch, as seen by the equal rod spacing in FIGS. 3C and 3F, and the outside edge 16 of the belt expands to a second larger pitch, as seen by comparing the rod spacing in FIGS. 3A and 3D.

Figure 3F:
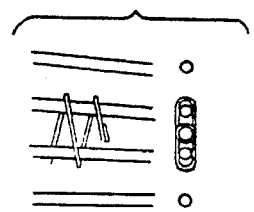
FIG. 3F is a top plan view and cross section of the spiral section taken along line 3F—3F of FIG. 1 with the connective links removed.
Figure 3G:
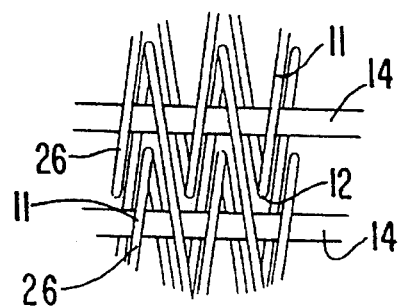
FIG. 3G is a detailed view of a portion of the spiral overlay of FIG. 1.

The spiral sections shown include the opposed elongated loops 32. The position of the rods within the elongated loops determines the distance they are apart, which consequently determines whether adjacent spirals are expanded or collapsed with respect to one another. As seen in FIG. 3A, when adjacent rods almost bear on the innermost bearing surfaces 34 of the elongated loops 32, the spirals are at their maximum contraction. Since the overlay of FIG. 1 is a tapered overlay. The amount of contraction and expansion across the width of the overlay will vary to accommodate the tapering spirals. As seen in FIGS. 3B and 3C, the adjacent rods 14 are in different positions relative to the elongated loops 32, even though at that point the overlay is at its maximum contraction. Similarly, FIGS. 3D–3F show a spiral in a section of the overlay which is more expanded than that shown in FIGS. 3A–3C, and the rods are disposed toward the outermost bearing surfaces 36. When adjacent rods 14 bear on the outermost bearing surfaces 36 of the elongated loops 32, the spirals are at their maximum expanded position. The amount of expansion or contraction is determined by the position of the rods within the elongated loops. FIG. 3G is a detailed view of two adjacent rods connecting intermeshed spirals 26. Spirals 26 in FIG. 3G are slightly collapsed relative to one another. If the belt were totally expanded, the rods would bear directly on the inner surfaces of the linking bends.

As mentioned above, the inside edge 18 of the belt illustrated in FIG. 1 remains at a constant pitch. Pitch control loops are thus not provided along the inside edge of the belt. However, if the inside edge of the belt is to collapse, such as in the belt disclosed in U.S. Pat. No. 4,078,655, pitch control loops would preferably be located adjacent the inside edge of the belt. Pitch control loops can also be provided at appropriate locations across the width of belts designed to travel around lateral curves in two directions, or in belts designed for straight line travel such as disclosed in U.S. Pat. No. 3,920,117.

In general, a single spiral has one or both of its ends, those last bends adjacent the side edges of the overlay, finished in some manner. The finishing is generally accomplished by forming a coil or loops, referred to as a pigtail at the end of the wire. In the FIG. 1 embodiment, pigtails 38 of each spiral are shown spaced from the rod at the leading edge 28 of the spiral forward of the leading edge rod on the inside of the belt and rearward on the inside. In the FIG. 5 embodiment, each spiral has a pigtail 38 fixed at its ends to a single rod at its leading edge 28. This in turn allows the trailing edge 30 of the spiral to intermesh with the rod at its trailing edge. The collapsibility of one spiral, therefore, is permitted only on one side in regard to any two adjacent rods since the pigtails are only on the leading edge. However, since each spiral is also intermeshed with another adjacent spiral at its trailing edge, the effect of a continuous spiral overlay is that all the spirals can collapse in either direction relative to the rods.

This is also true for the modular embodiments which will be described. All of the individual spirals, upstanding or flat, which are on a pair of rods, will have pigtails fixing them to the rod at their leading edges. Alternative configurations for pigtail configuration and location will be discussed with reference to FIGS. 83–86.

Figure 5:
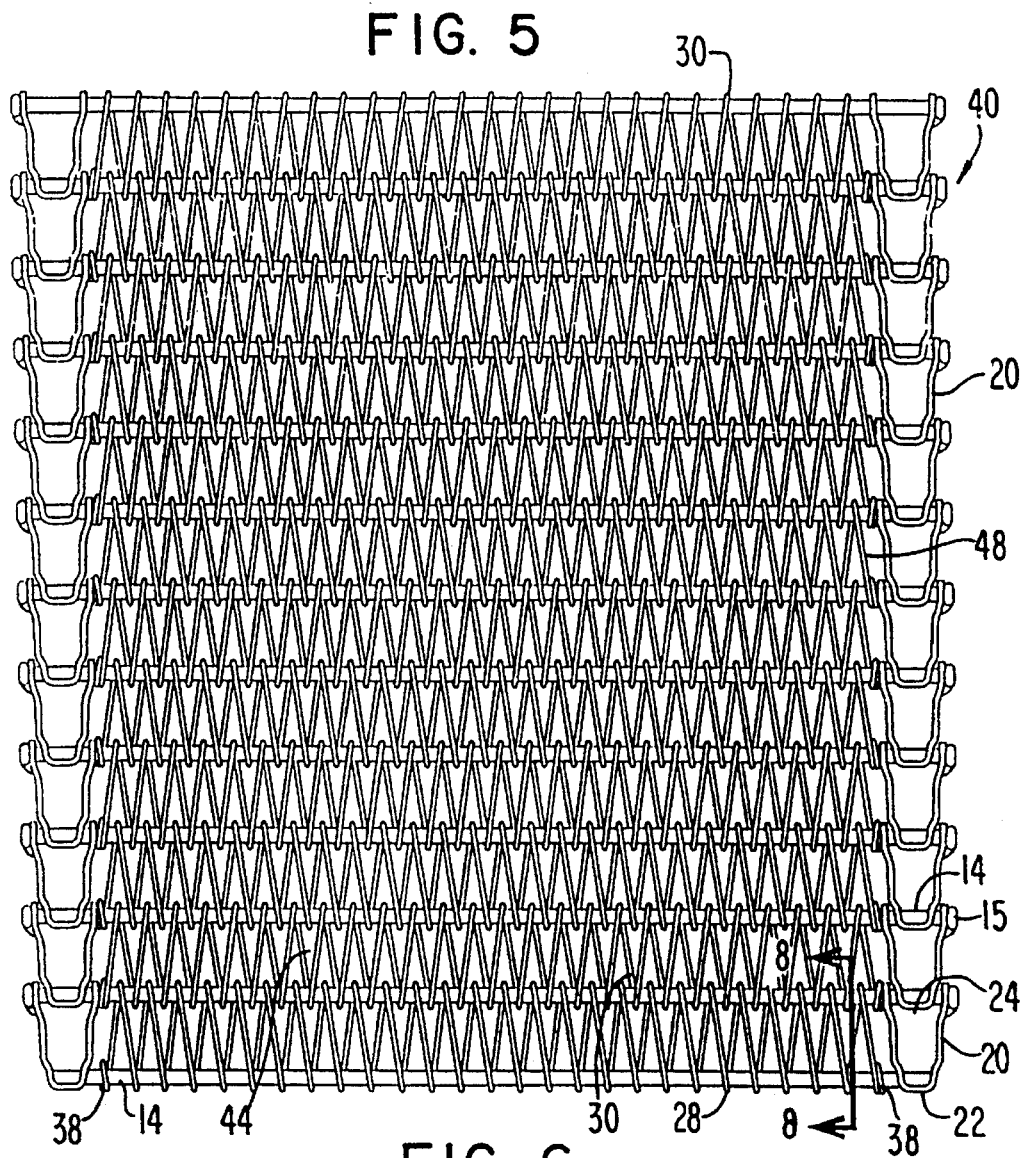
FIG. 5 is a top plan view of a spiral overlay section in accordance with a second preferred embodiment of the present invention.
Figure 78:
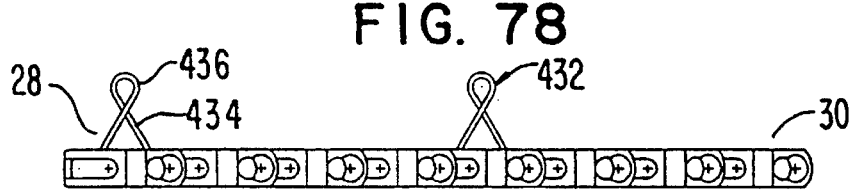
FIG. 78 is a side elevational view of the overlay of FIG. 76.
Figure 80:
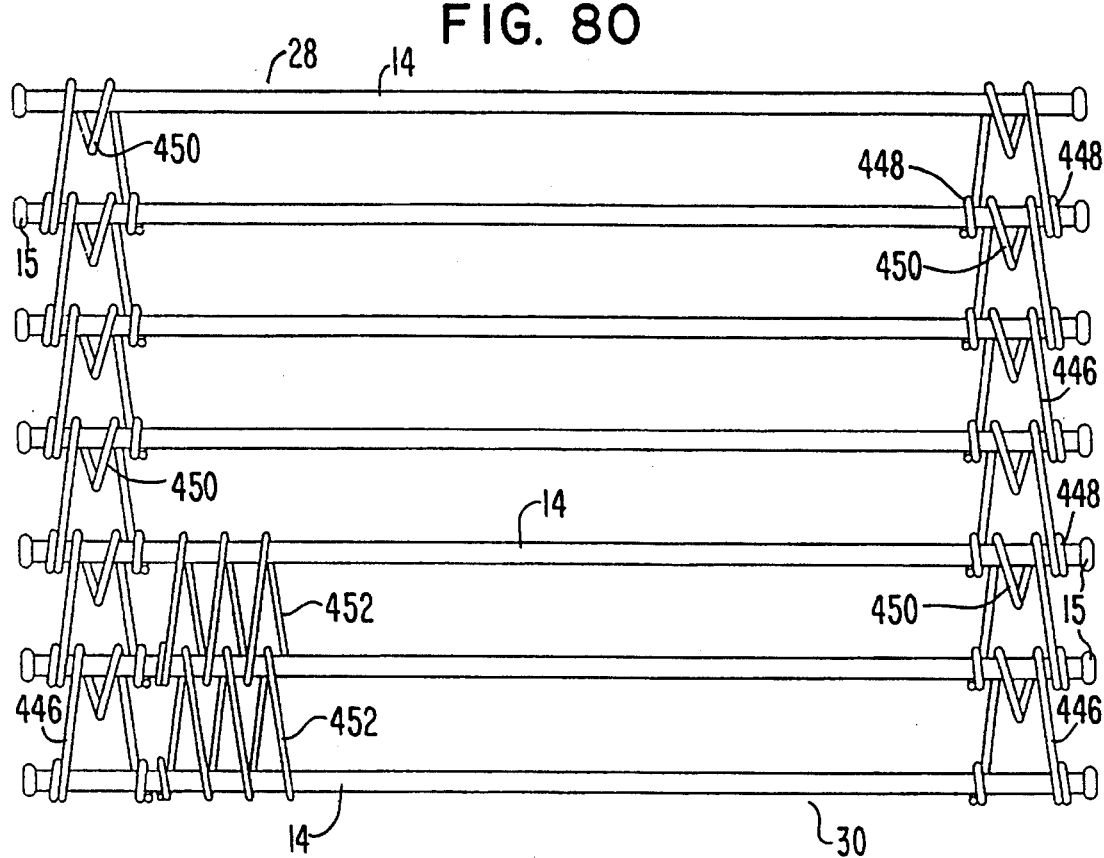
FIG. 80 is a top plan view of a partially assembled spiral overlay section showing wire connecting links.
Figure 81:
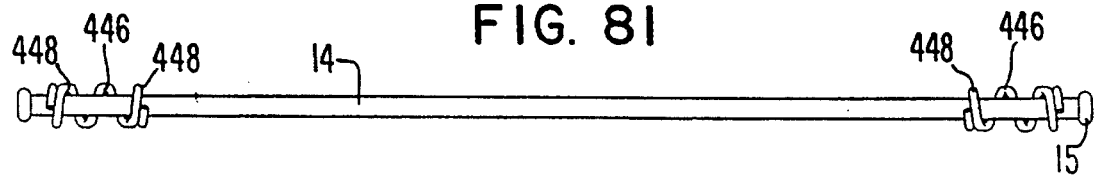
FIG. 81 is a front elevational view of a partially assembled overlay showing a front view of the wire connecting links of FIG. 80.
Figure 82:
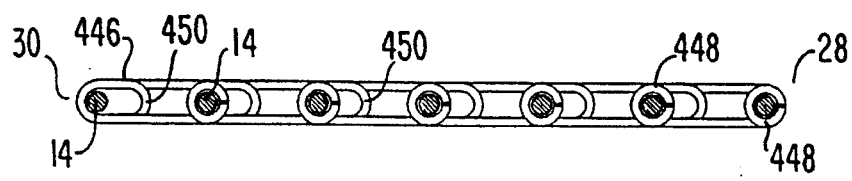
FIG. 82 is a side elevational view of the overlay of FIG. 80.

Broadly, FIGS. 5–78 illustrate various embodiments of spiral overlays having upstanding elements arranged thereon as lifts, dividers, or edge guards for providing traction and/or separation to the items being conveyed. The upstanding elements are either formed integrally on the spirals, or are modular components formed of wire and assembled with spacers, preferably formed of wire spirals, to form the overlay. For clarity of illustration the drawings do not show it, but overlays with upstanding elements may also incorporate elongated loops in the spirals to provide pitch control as described above concerning FIGS. 1–3G, and may also be tapered with proportionally sized upstanding elements. All of the preferred embodiments show spiral overlays in which adjacent spirals can collapse relative to one another in at least one direction, as described above. Any combination of circular loops and elongated loops may be incorporated into the spirals in order to provide either fixed relation of the spirals and rods or pitch control between the rods. Since all of the preferred embodiments comprise certain components in common such as the connecting rods and connective links, in similar relation to one another as previously described, the following embodiments will generally be described as to their differences. Specifically, the spirals, their shapes and interrelationships, with descriptions of the other common components where they vary. FIGS. 80–82 illustrate an alternate embodiment of connective links which may be used with any of the described overlays. The labeling of the leading side or edge 28 and/or trailing side or edge 30 in the drawing figures indicates the conveying direction in the following embodiments.

FIGS. 5–21 illustrate overlay configurations made up of integral, one-piece spirals incorporating upstanding elements on the conveying surfaces thereof. The term integral refers to the formation of an individual spiral that extends over a substantial portion of the width of the belt, preferably from one side of the conveyor belt to the other side, from a single piece of wire. If, for example, a line of connective links were located in the center of the belt, an integral spiral could be located on either side of the center line of the links, one or more of the upstanding elements, however, would be formed in one piece with the integral section. In general the upstanding elements can be of any polygonal shape, and in these embodiments they are equilateral triangles.

Figure 6:
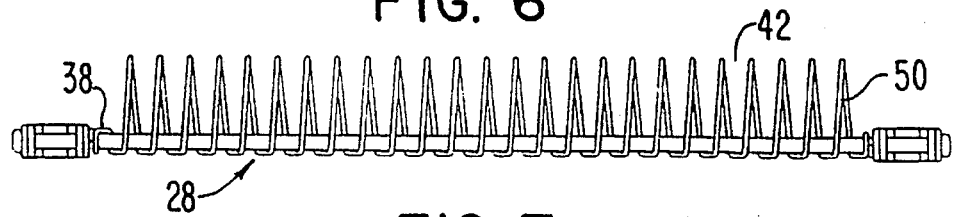
FIG. 6 is a front elevational view of the overlay of FIG. 5.
Figure 7:
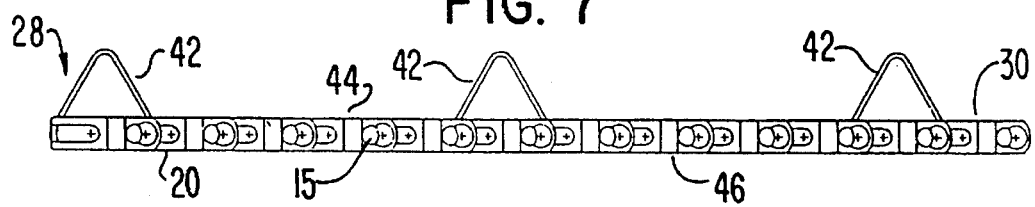
FIG. 7 is a side elevational view of the overlay of FIG. 5.
Figure 8:
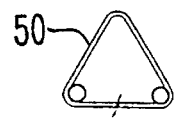
FIG. 8 is a cross-section of the overlay taken along line 8—8 of FIG. 5.

FIGS. 5–8 illustrate an overlay 40 according to a second preferred embodiment of the present invention comprising upstanding elements which form lifts 42, as seen in FIG. 6, arranged intermittently on the upper conveying surface 44 or top of the overlay. The lower surface 46 of overlay 40 is generally flat as seen in FIG. 7. Overlay 40 is made up of two types of spirals: flat spirals 48 and triangular helical spirals 50 interconnected together by rods 14. Flat spirals 48 form the conveying surface of the overlay between triangular spirals 50 arranged intermittently as necessary to act as lifts. The lifts provide traction for articles carried by the overlay in traversing inclines, in particular, where the articles may tend to slide relative to the conveying surface and one another, accumulating at the bottom of the incline. The spacing between intermittent rows of lifts 42 may be varied by simply arranging upstanding spirals 50 between fewer flat spirals 48 during assembly of the overlay. The spacing of lifts 42 will depend on the type of article being conveyed, for example, larger items would generally warrant a greater spacing than smaller items.

Figure 9:
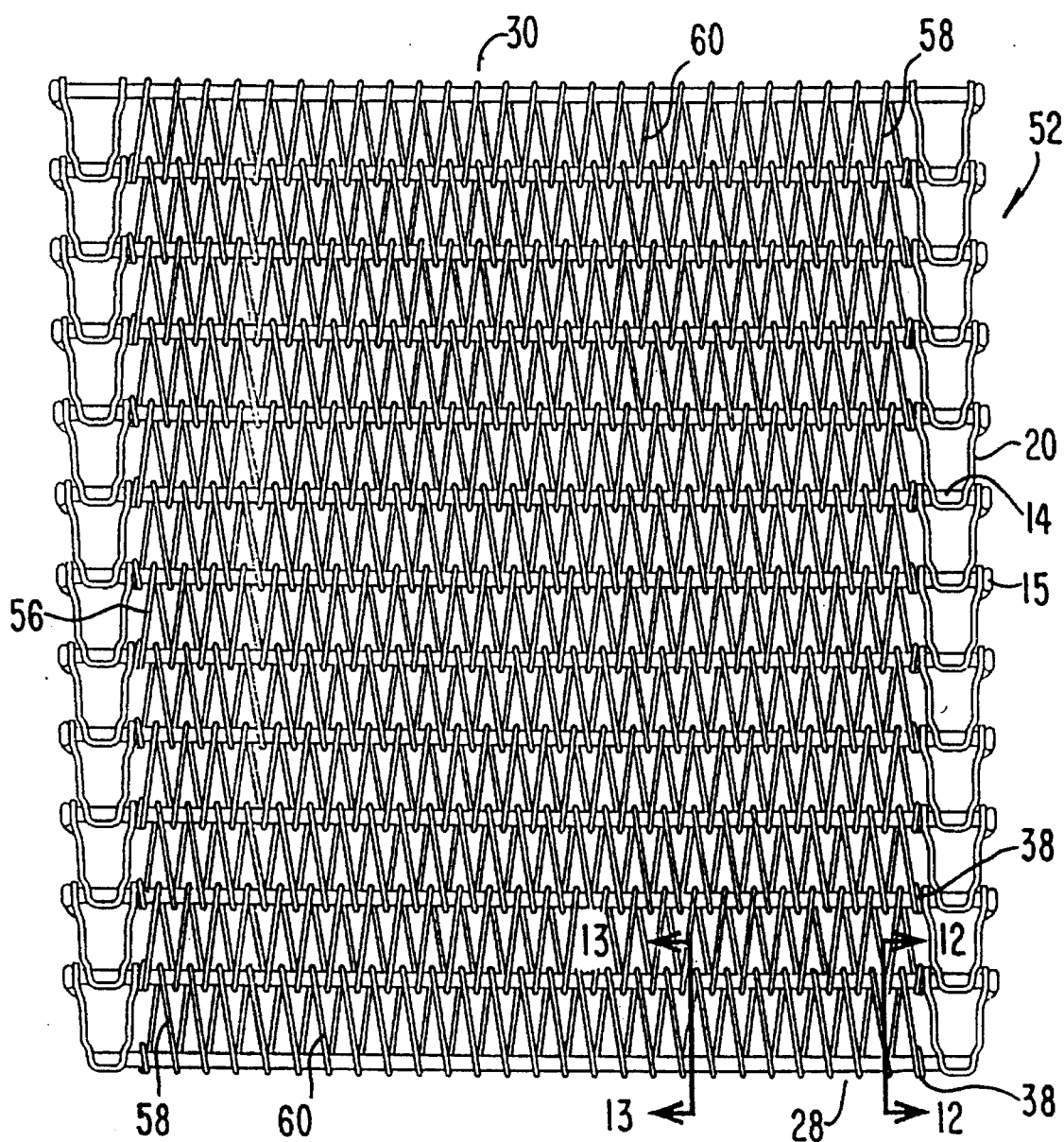
FIG. 9 is a top plan view of a spiral overlay section in accordance with a third preferred embodiment of the present invention.
Figure 10:
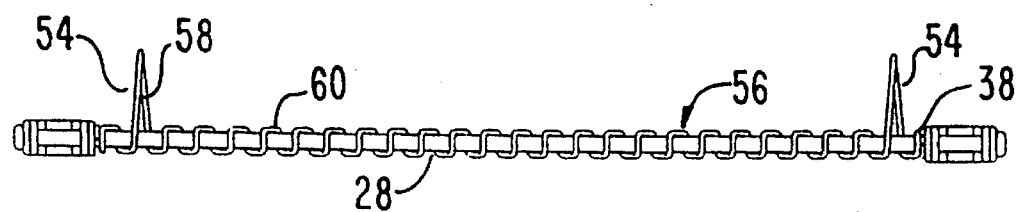
FIG. 10 is a front elevational view of the overlay of FIG. 9.
Figure 11:
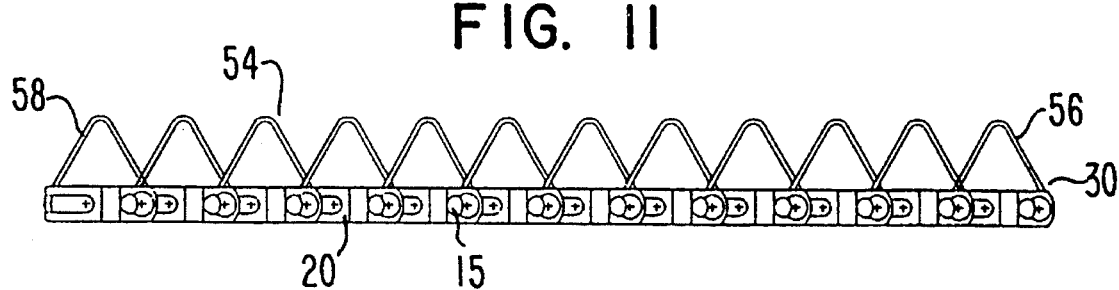
FIG. 11 is a side elevational view of the overlay of FIG. 9.
Figure 12:
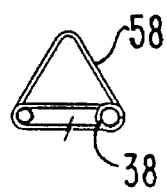
FIG. 12 is a cross-section of the overlay taken along line 12—12 of FIG. 9.
Figure 13:
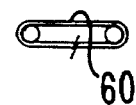
FIG. 13 is a cross-section of the overlay taken along line 13—13 of FIG. 9.

FIGS. 9–13 illustrate an overlay 52 according to a third preferred embodiment of the present invention comprising upstanding elements which form edge guards 54, as seen in FIGS. 10 and 11, which are arranged along the side edges of overlay 52. Overlay 52 is made up of a plurality of a single type of integral spiral 56, with each individual spiral having triangular helical portions 58 at the ends and flat helical portions 60 therebetween. The triangular helical portions 58 of spirals 56 are aligned with one another to form edge guards 54 which extend longitudinally along the side edges of the overlay to prevent articles from falling off of the conveyor. FIGS. 12 and 13 illustrate the cross-sections of one spiral at different distances from a side edge. FIG. 12 illustrates one of the triangular helical portions 58 and pigtail 38 at the end of the spiral. FIG. 13 illustrates one of the flat helical portions 60.

Figure 14:
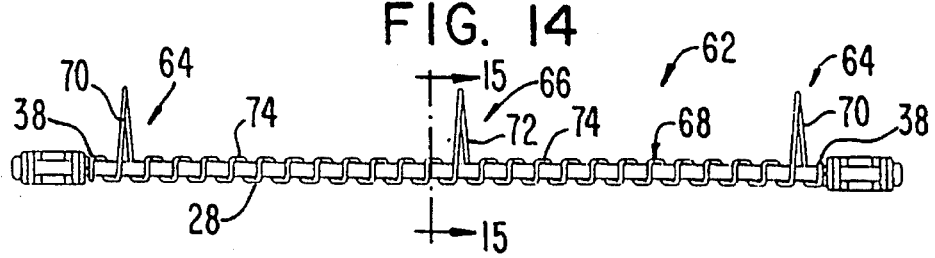
FIG. 14 is a front elevational view of a spiral overlay in accordance with a fourth preferred embodiment of the present invention.
Figure 15:
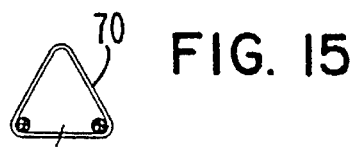
FIG. 15 is a cross-section of the overlay taken along line 15—15 of FIG. 14.

FIGS. 14–15 illustrate an overlay 62 according to a fourth preferred embodiment of the present invention comprising upstanding elements which form edge guards 64 and further upstanding elements which preferably form a central lane divider 66. Overlay 62 is made up of a plurality of a single type of integral spirals, each individual spiral 68 having triangular helical end portions 70 and a triangular helical central portion 72, and flat helical portions 74 therebetween. When the spirals are aligned with one another, the triangular helical end portions 70 form edge guards 64 substantially similar to the edge guards 54 overlay of FIGS. 9–13. In addition, the triangular helical central portions 72 form lane divider 66. Both the edge guards 64 and lane divider 66 extend longitudinally on the overlay, the edge guards prevent articles from falling off and the lane divider separates articles on the overlay. Although this embodiment illustrates a single lane divider 66, it is contemplated that an individual spiral may have any number of upstanding helical portions, which when aligned with the upstanding helical portions of the other spirals of the overlay, form any desired number of lane dividers. FIG. 15 illustrates the cross-section of one spiral at a lane divider 66. The top plan view and side views of the overlay and edge guard are similar to the embodiment illustrated in FIGS. 9–13.

Figure 16:
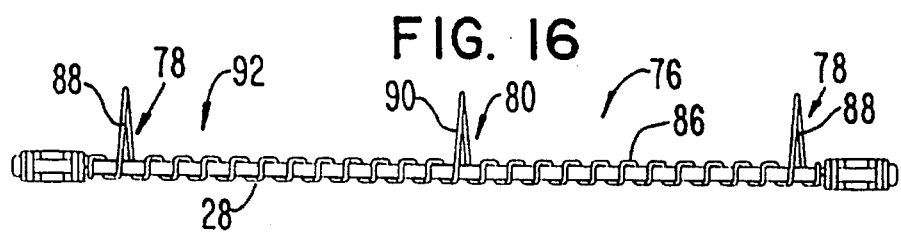
FIG. 16 is a front elevational view of a spiral overlay in accordance with a fifth preferred embodiment of the present invention.
Figure 17:
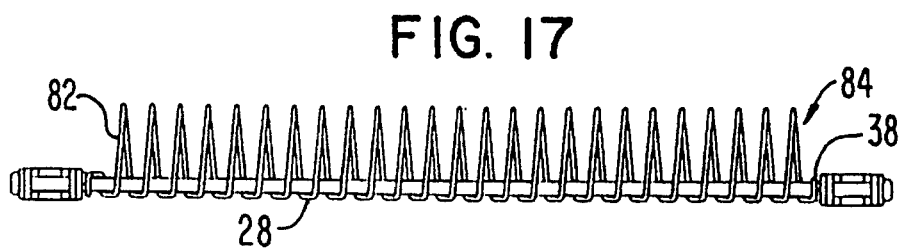
FIG. 17 is a front elevational view of a lift element of the overlay of FIG. 16.

FIGS. 16 and 17 illustrate elevational end views an overlay 76 according to a fifth preferred embodiment of the present invention comprising upstanding elements which form edge guards 78, further upstanding elements which preferably form a central lane divider 80, and intermittently arranged triangular helical spirals 82 which form lifts 84, with all of the upstanding elements configured as equilateral triangles. This embodiment in essence combines the features of the embodiments of FIGS. 5–8 and FIGS. 14–15, with the resulting overlay having the advantages of both. Overlay 76 is made up of two types of spirals: (1) spirals 86 having flattened areas in between triangular helical end portions 88 and a triangular helical central portion 90; and (2) triangular helical spirals 82 interconnected together by rods 14. As described above with regard to the embodiment of FIGS. 14–15, spirals 86 when aligned provide the overlay with edge guards 78 and a lane divider 80.

In addition, when triangular spirals 82 are arranged intermittently to provide lifts 84 as described with regard FIGS. 5–8, the resulting overlay 76 has, on its conveying surface, pockets 92 of generally flat conveying areas. FIGS. 16 and 17 illustrate the front view of the overlay from different areas along the length of overlay 76, FIG. 16 shows the edge guards 78 and lane divider 80, while FIG. 17 shows a triangular helical spiral 82. The provision of edge guards 78 and a lane divider 80 keeps the articles on the conveyor separated, and the lifts provide the necessary traction for the articles in traversing inclines. As a result, the pockets 92 maintain separation of the articles and generally prevent the articles from sliding or moving relative to the conveying surface and one another. As described above, the number of lane dividers may be adjusted by simply forming spirals 86 with the desired number of triangular helical central portions. Overlay 76 may be especially advantageous for conveying premeasured quantities of articles, or for maintaining separation between components to assemble or otherwise process.

Figure 18:
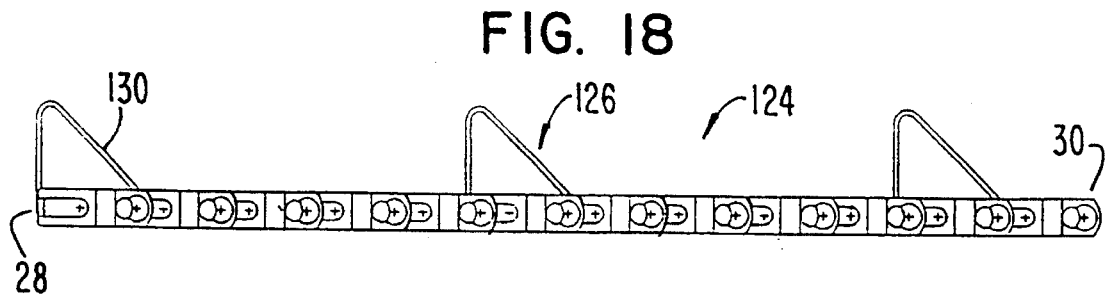
FIG. 18 is a side elevational view of a modified right-triangular configuration of the overlay of FIG. 5.
Figure 19:
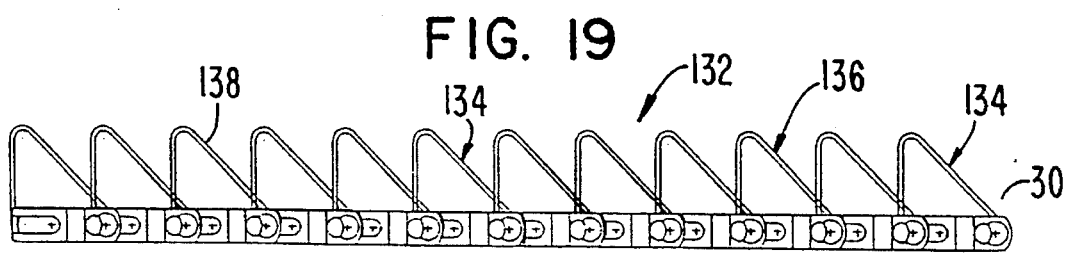
FIG. 19 is a side elevational view of a modified right-triangular configuration of the overlay of FIG. 9.

FIGS. 18 and 19 illustrate more overlay configurations made up of integral, one-piece spirals incorporating upstanding elements on the conveying surfaces thereof. In these embodiments the upstanding elements are right triangles. Although the spirals of the following embodiments are shown with the leg of the right triangle which is perpendicular to the conveying surface is at the leading side, it will be understood that the opposite configuration, that is, with the perpendicular leg at the trailing side of the overlay, may be preferred for some applications.

FIG. 18 is a side view of an overlay section 124 having lifts 126 which is a right-triangular lift version of overlay 40 shown in FIG. 5, and reference is made to the description of overlay 40. Overlay section 124 is made up of flat spirals and right-triangular helical spirals 130 interconnected together by rods 14. FIG. 19 is a side view of an overlay section 132 having edge guards 134, and which is a right-triangular version of overlay 52 shown in FIG. 9.

A right-triangular version of overlay 62 shown in FIG. 14 and 15, having edge guards and a central lane divider is contemplated, and would have a side view identical to FIG. 19, and a front elevational view similar to FIG. 14. A right-triangular version of overlay 76 shown in FIGS. 16 and 17 is also contemplated, and would have front elevational views similar to FIGS. 16 and 17. The resulting overlay would have pockets of generally flat conveying areas on its conveying surface similar to pockets 92 in FIG. 16.

Figure 20:
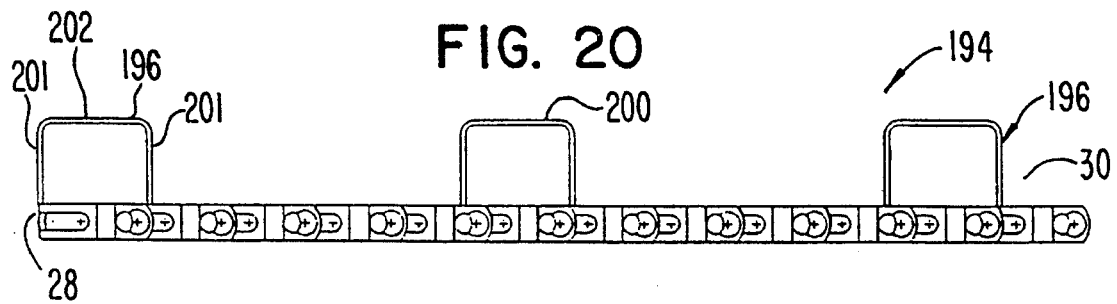
FIG. 20 is a side elevational view of a modified rectangular configuration of the overlay of FIG. 5.
Figure 21:
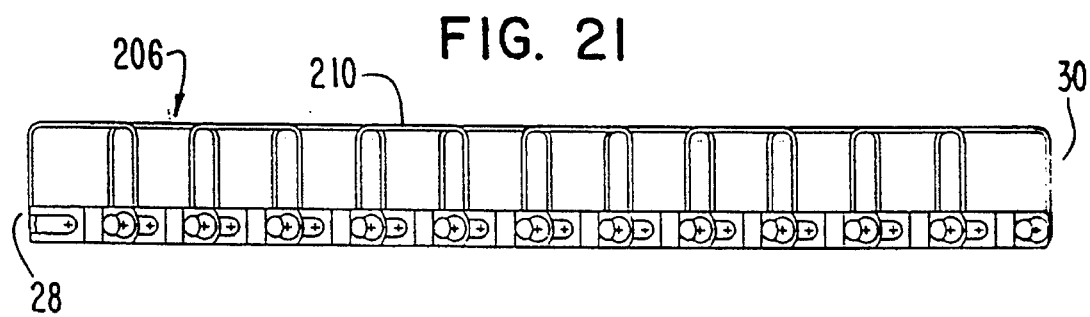
FIG. 21 is a side elevational view of a modified rectangular configuration of the overlay of FIG. 9.
Figure 22:
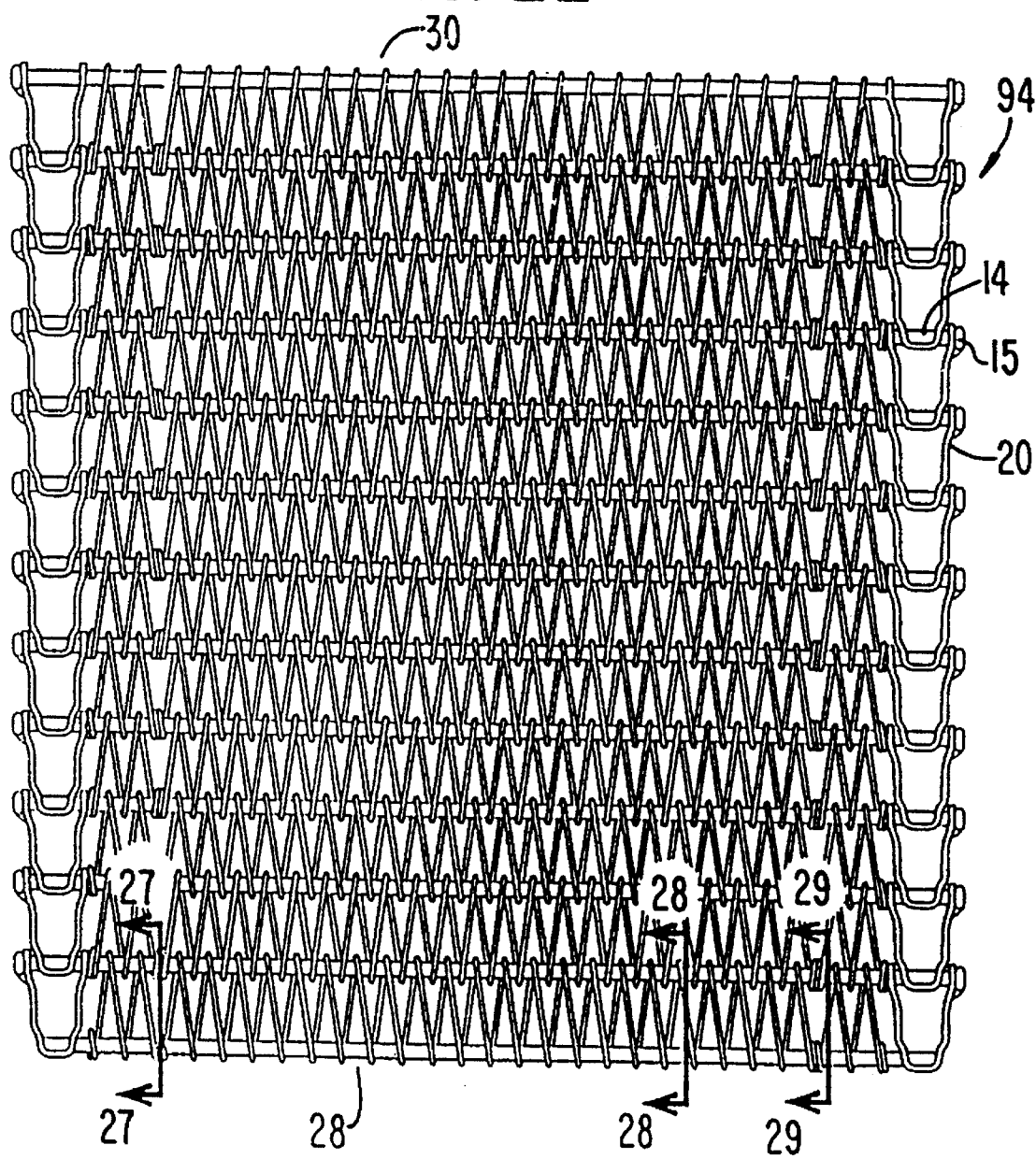
FIG. 22 is a top plan view of a spiral overlay in accordance with a sixth preferred embodiment of the present invention.

FIGS. 20 and 21 illustrate even more overlay configurations made up of integral, one-piece spirals incorporating square or, more broadly, rectangular upstanding elements on the conveying surfaces thereof. The upstanding elements incorporate two right-angle bends to form the legs of rectangles, with the horizontal leg being parallel to the conveying surface of the overlay and may be equal in length to the distance between the rods.

FIG. 20 illustrates an overlay section 194 is a rectangular lift version of overlay 40 shown in FIG. 5, and reference is made to the description of overlay 40. The rectangular spirals 200 generally have two upstanding legs 201 which are perpendicular to the conveying surface. The upstanding legs 201 are joined by a leg 202 which is parallel to the conveying surface. The legs 201 and 202 have substantially right-angle bends between them. FIG. 21 illustrates an overlay section 204 which is a rectangular version of overlay 52 shown in FIG. 9, and reference is made to the description of overlay 52. A rectangular version of overlay 62 shown in FIG. 14 is also contemplated and would have a front elevational view similar to FIG. 14. A rectangular version of overlay 76 shown in FIGS. 16 and 17 also contemplated and would have front elevational views similar to FIGS. 16 and 17 and a side view identical to FIG. 21. The resulting overlay would have pockets of generally flat conveying areas on its conveying surface similar to pockets 92 in FIG. 16.

FIGS. 22–35 illustrate modular overlay configurations, similar to the edge guard embodiment of FIGS. 9–13, and the edge guard plus lane divider embodiment of FIGS. 14–15. The modular overlay embodiments are made up of upstanding spiral components and flat spiral components assembled together to form edge guards with or without lane dividers. As with the integral spirals, the upstanding elements can be of any polygonal shape, and are preferably formed by high tensile stainless steel wire.

Figure 23:
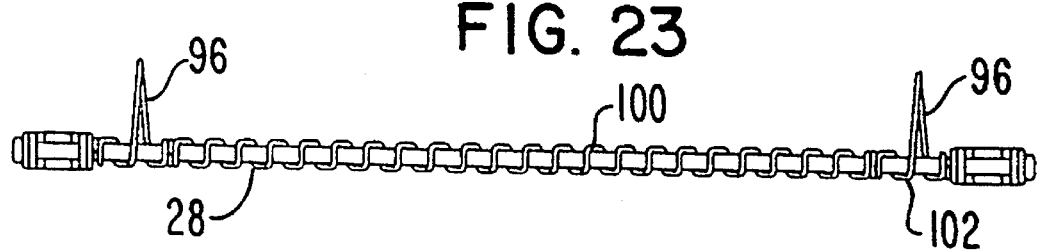
FIG. 23 is a front elevational view of the overlay of FIG. 22.

FIGS. 22–29 illustrate an overlay 94 according to a sixth preferred embodiment of the present invention comprising modular upstanding triangular spirals 96 which form edge guards 98, as seen in FIGS. 23 and 24, which are arranged along the side edges of overlay 94, and flat spirals 100 arranged between the edge guards 98 to form the conveying surface of the overlay and spacers between edge guards 98. Reference is made to FIGS. 25 and 26 to clearly describe the relationship between individual spirals 96 and 100 and the rods. Although FIGS. 25 and 26 show only one side edge of the overlay, it will be understood that the opposite side edge is a mirror image. Upstanding spiral 96 has circular loops 102 on both of its sides which form a pigtail around rod 14 to secure the loops to the rod. Circular loops 102 of spiral 96 are formed at the leading edge 104 of the spiral. Similarly, flat spiral 100 also has circular loops 108 forming a pigtail around the same rod 14. Circular loops 102 and 108 are the pigtails for their respective spirals, and are therefore connected to the same rod.

Overlay 94 is a modular version of overlay 52 of FIG. 9, having equilateral triangular helical spirals 96 arranged adjacent the side edges of the overlay, and flat spirals 100 arranged between triangular spirals 96. The triangular spirals 96 are aligned with one another to form edge guards 98 which extend longitudinally along the side edges of the overlay to prevent articles from falling off of the conveyor. FIGS. 27–29 illustrate the cross-sections of the modular spirals at different distances from a side edge. FIG. 29 is the cross-section of a triangular spiral 96, and FIG. 28 is a cross-section of a flat spiral 100. FIG. 29 is a cross-section of a triangular spiral 96 near the pigtail 102.

Figure 30:
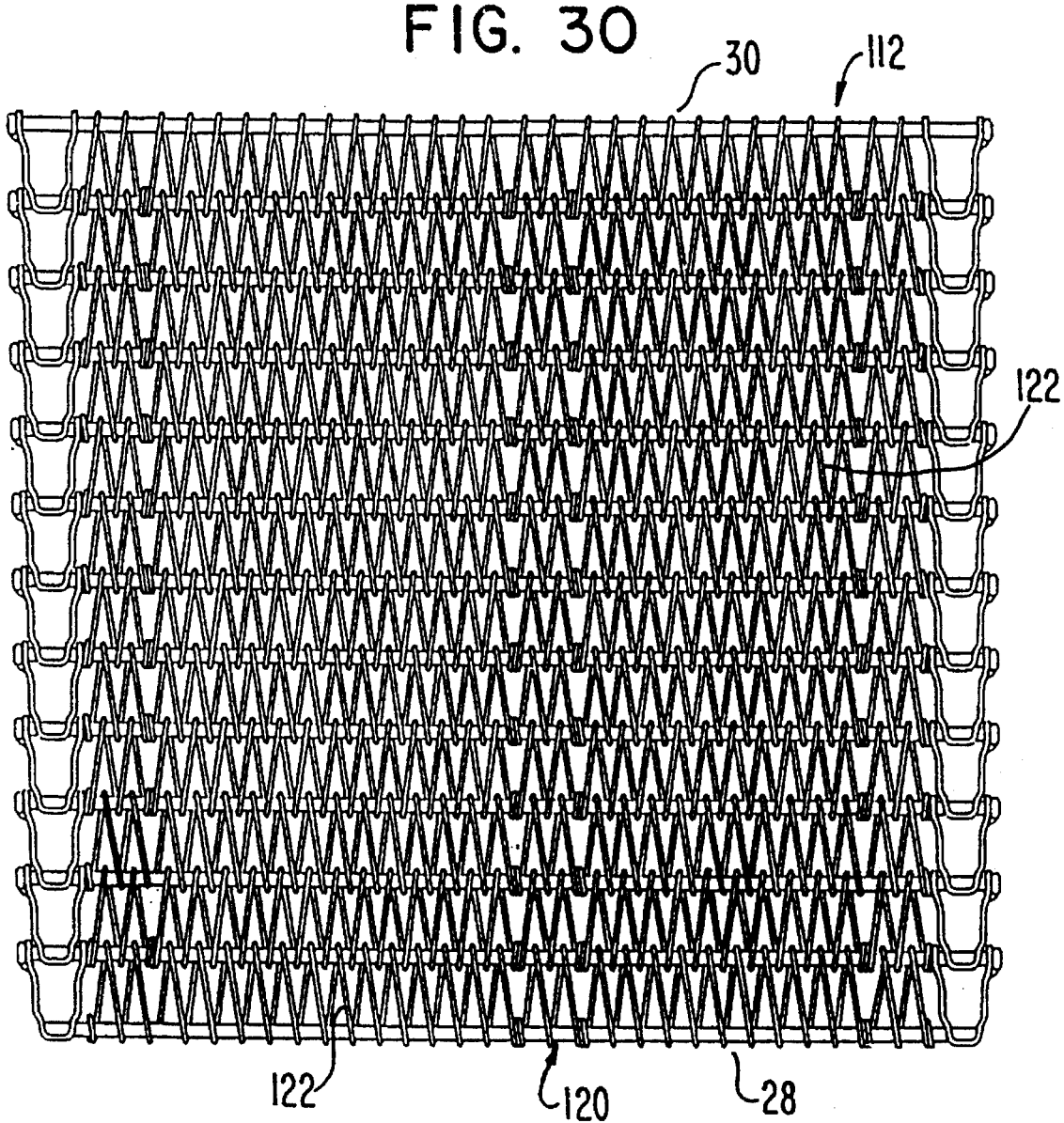
FIG. 30 is a top plan view of a spiral overlay section in accordance with a seventh preferred embodiment of the present invention.
Figure 31:
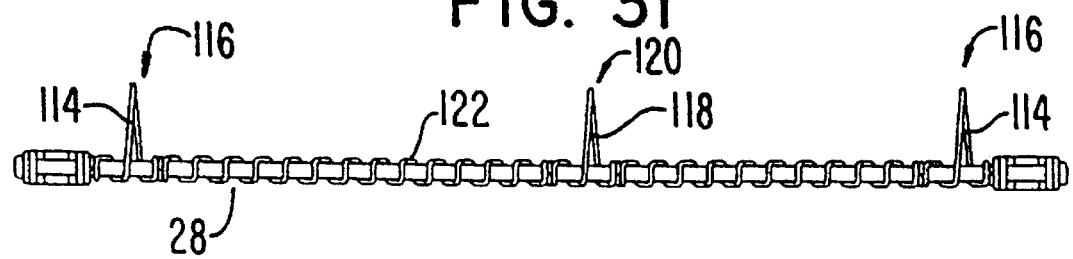
FIG. 31 is a front elevation view of the overlay of FIG. 30.

FIGS. 30–35 illustrate variations on the modular overlay configurations. FIGS. 30 and 31 illustrate a modular overlay 112 according to a seventh preferred embodiment of the present invention. Overlay 112 is a modular version of overlay 62 of FIG. 14. Flat spirals 122 are arranged between upstanding spirals 114 and 118 to form a generally flat conveying surface. Of course, more central spirals 118 could be used to form multiple lane dividers across the overlay with shorter flat spirals 122 placed therebetween. FIGS. 30 and 31 represent the top plan view and front elevational view of overlay sections having any polygonal shape, including the equilateral triangular.

The relationship between individual spirals 114, 118 and 122 and the rods is similar to that described above with regard to overlay 94 of FIGS. 22–29. Center spirals 118 are connected to the rods 14 in the same way as edge guards 96. Reference is made to the above-described relationship between the circular loops and the rods, and the collapsibility of such an arrangement.

Figure 32:
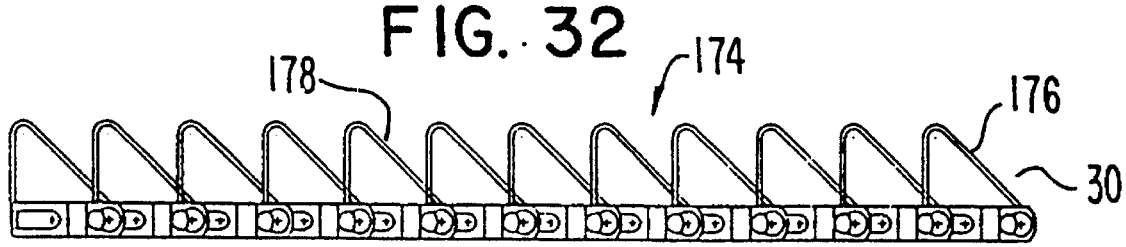
FIG. 32 is a side elevational view of a modified right-triangular configuration of the overlay of FIG. 30.
Figure 33:
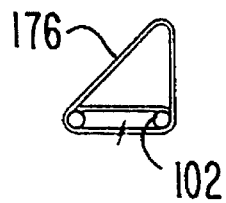
FIG. 33 is a cross-section of a spiral of FIG. 32.

FIGS. 32–35 illustrate alternatives to the modular edge guard embodiment of FIGS. 22–29 and the edge guard plus lane divider embodiment FIGS. 30 and 31. FIG. 32 illustrates the side elevational view of a modular overlay section 174 which is a right-triangular version of overlay 94 shown in FIG. 22. It is understood that FIG. 32 also represents the side view of a modular right-triangular version of overlay 112 as shown in FIG. 30. FIG. 33 illustrates a cross-section of the right-triangular modular spiral at a side edge.

Figure 34:
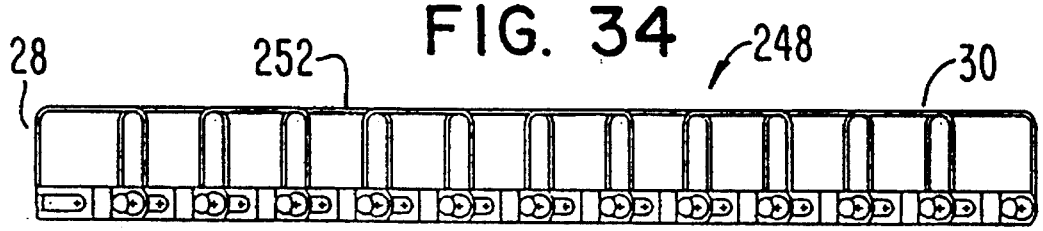
FIG. 34 is a side elevational view of a modified rectangular configuration of the overlay of FIG. 30.
Figure 35:
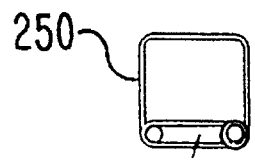
FIG. 35 is a cross-section of a spiral of FIG. 34.
Figure 36:
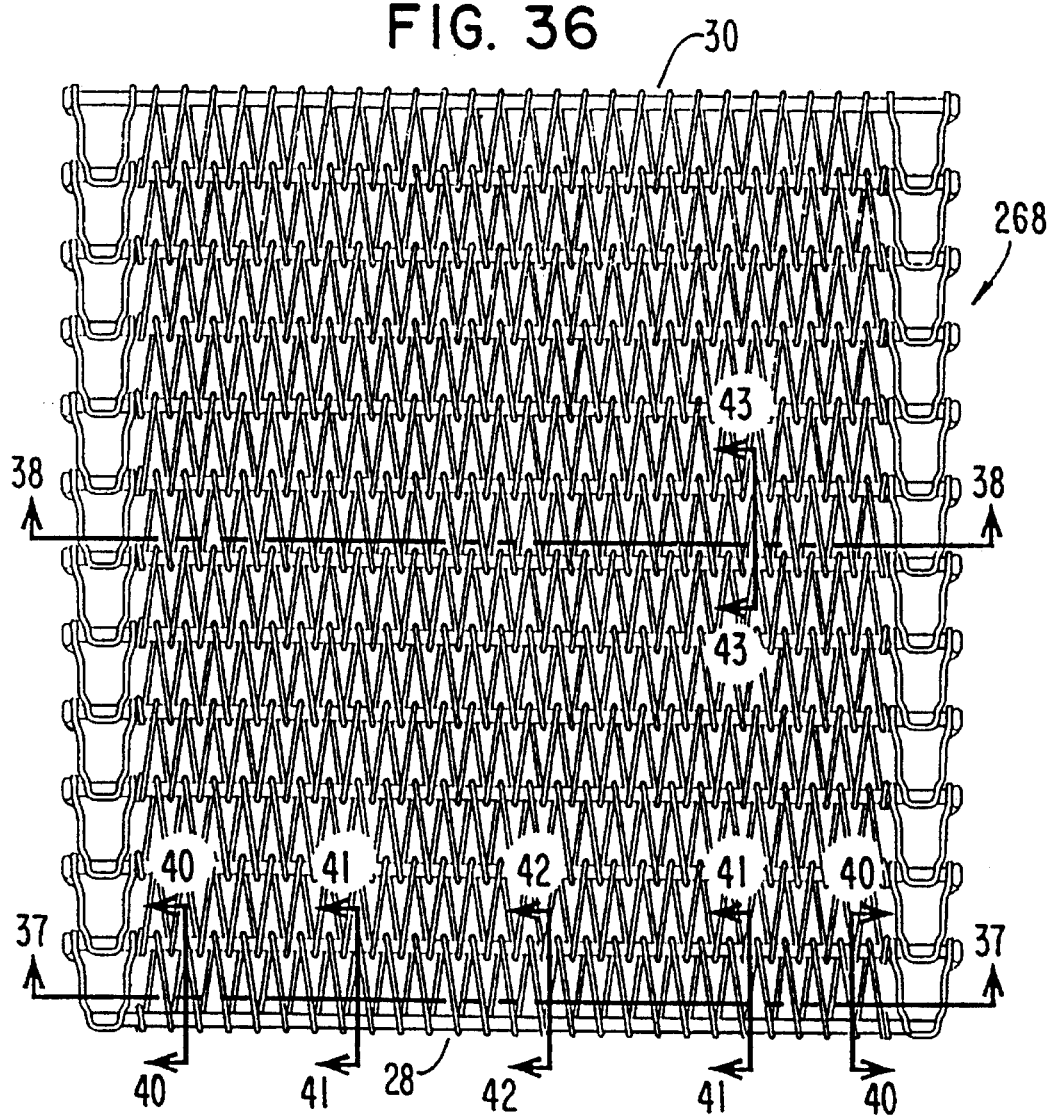
FIG. 36 a top plan view of a spiral overlay in accordance with an eighth preferred embodiment of the present invention.

FIGS. 34 and 35 illustrate alternative modular overlay configurations having rectangular upstanding spirals. FIG. 34 illustrate an overlay section 248 having edge guards 252 of rectangular spirals 250, and which is a rectangular version of overlay 94 shown in FIG. 22. FIG. 35 illustrates a cross-section of the rectangular modular spiral at a side edge. It is understood that FIG. 34 also represents the side view of a modular rectangular version of overlay 112 as shown in FIG. 30. FIG. 35 is a cross-section of the rectangular modular spiral at a side edge.

Figure 37:
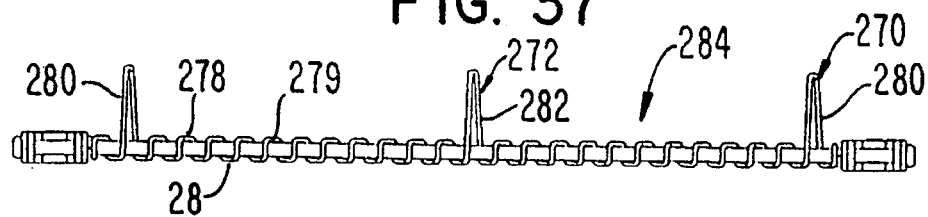
FIG. 37 is a front elevational view of the overlay of FIG. 36.
Figure 38:
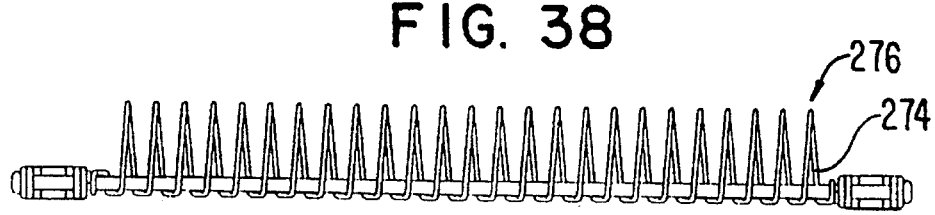
FIG. 38 is an elevational view of the overlay taken along line 38—38 of FIG. 36.

FIGS. 36–43 illustrate an overlay 268 according to a eighth preferred embodiment of the present invention comprising upstanding elements which form edge guards 270, a central lane divider 272, and intermittently arranged triangular helical spirals 274 which form lifts 276. Overlay 268 is a combination version of overlay 40 shown in FIG. 5 and overlay 210 shown in FIG. 21. That is to say, overlay 268 is made up of integral spirals 278 having flattened areas 279 in between rectangular helical end portions 280 and an integral rectangular helical central portion 282 and triangular helical spirals 274 interconnected together by rods 14. When the rectangular upstanding elements are aligned, they form edge guards 270 and a lane divider 272. In addition, when triangular spirals 274 are arranged intermittently to provide lifts 276, the resulting overlay 268 has, on its conveying surface, pockets 284 of generally flat conveying areas. FIGS. 37 and 38 illustrate the front view of the overlay from different reference lines, FIG. 37 shows the edge guards 270 and lane divider 272, while FIG. 38 shows a triangular helical spiral 274. As described above, the number of pockets may be adjusted by simply forming spirals 278 with the desired number of rectangular helical central portions. FIGS. 40–42 illustrate the cross-sections of one spiral 278 having rectangular helical portions at the ends and center, at different distances from a side edge. FIG. 43 illustrates a cross-section of the triangular helical spiral 274.

Although overlay 268 uses equilateral triangular lifts and rectangular edge guards and lane dividers, it will be understood that any combination of geometric shapes may be used for the upstanding elements. Combining different shapes is within the scope of the invention. The shapes which are selected for the upstanding elements will depend upon a variety of factors such as amount of traction desired, sizes and types of articles to be conveyed, the angle of any incline, and the like.

FIGS. 44–52 illustrate additional overlay configurations made up of integral spirals incorporating upstanding elements on the conveying surfaces thereof. In these embodiments the upstanding elements are rod lifts which comprise polygonal shapes incorporating loops above the conveying surface of the overlay to receive lift rods, thereby providing a sturdier lift. Although various triangular shapes are illustrated to describe the following embodiments, any of the above-mentioned shapes or other polygonal shapes are within the scope of the invention.

Figure 44:
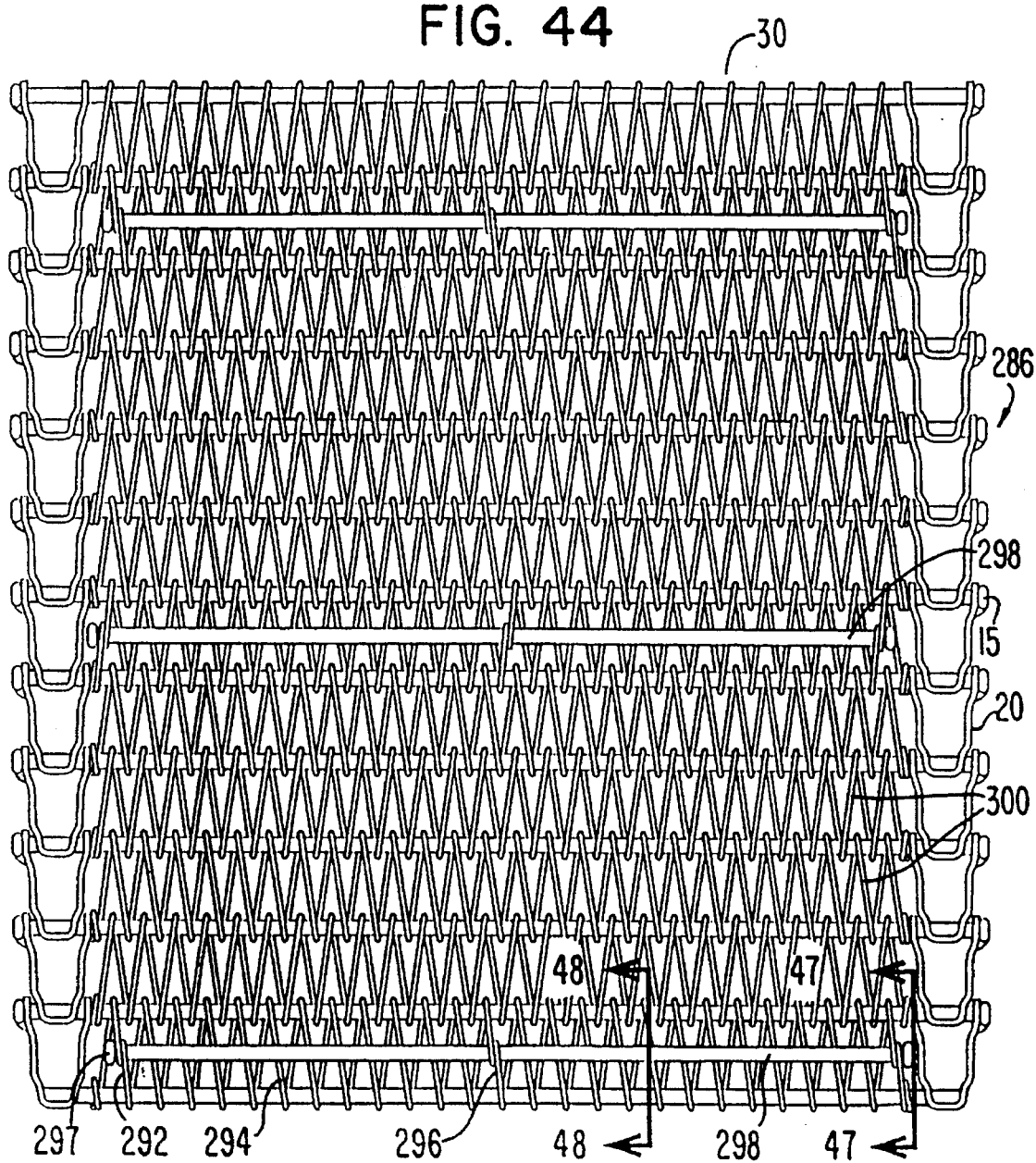
FIG. 44 is a top plan view of a spiral overlay in accordance with a ninth preferred embodiment of the present invention.
Figure 45:
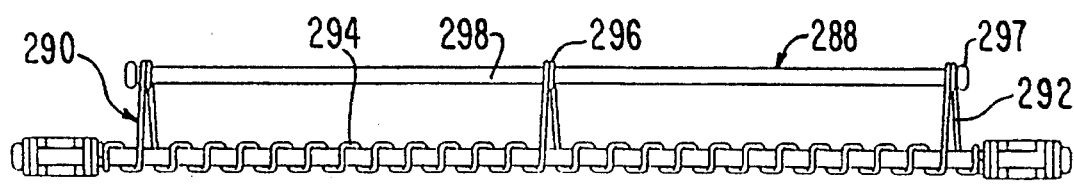
FIG. 45 is a front elevational view of the overlay of FIG. 44.
Figure 46:
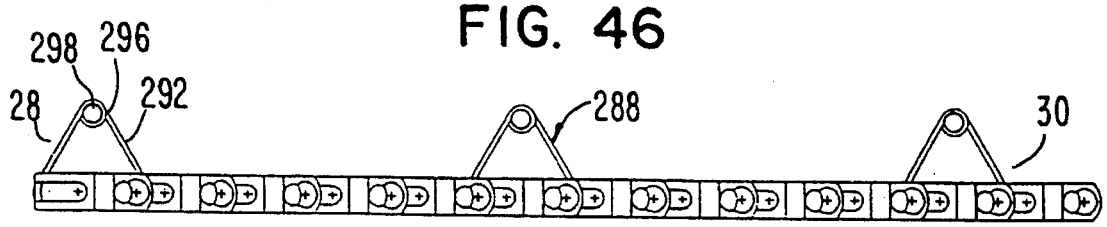
FIG. 46 is a side elevational view of the overlay of FIG. 44.
Figure 47:
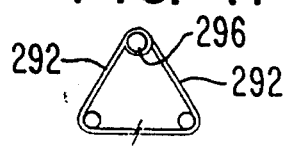
FIG. 47 is a cross-section of the overlay taken along line 47—47 of FIG. 44.
Figure 48:
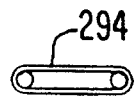
FIG. 48 is a cross-section of the overlay taken along line 48—48 of FIG. 44.

FIGS. 44–48 illustrate an overlay 286 according to a ninth preferred embodiment of the present invention comprising upstanding elements which form lifts 288, as seen in FIGS. 45 and 46, arranged intermittently on the conveying surface of the overlay. Overlay 286 is made up of integral lift spirals 290, each individual lift spiral 290 having upstanding portions 292, flat portions 294 and circular loops 296 integrally formed on the upstanding portions. Circular loops 296 receive lift rods 298 which extend across the overlay in the transverse direction. Lift rods 298 are disposed parallel to the conveying surface of overlay 286, and provide added strength to the lifts 288. The ends of lift rods 298 are finished with a buttonhead 297 which retains the lift rods in the outermost coil loops adjacent the side edges of the overlay. Although not shown, the buttonheads could be welded to the coil loops to ensure a secure attachment in all embodiments of the present invention using lift rods. Lift spirals 290 are arranged intermittently among flat helical spirals 300 which form the generally flat conveying surface. FIGS. 47 and 48 illustrate cross-sections of the lift spiral and lift rod at different distances from the side edge.

Overlay 286 uses equilateral triangular lift spirals with three upstanding helical portions 292 to retain the lift rods 298, however, the lift spirals may be formed with any number of upstanding helical portions in order to further strengthen the lifts 288. In addition, the coil loops 296 of overlay 286 are formed at the topmost bend of the triangular portions, but as will be seen in the following embodiments, the coil loops may be formed anywhere on the upstanding elements.

Figure 49:
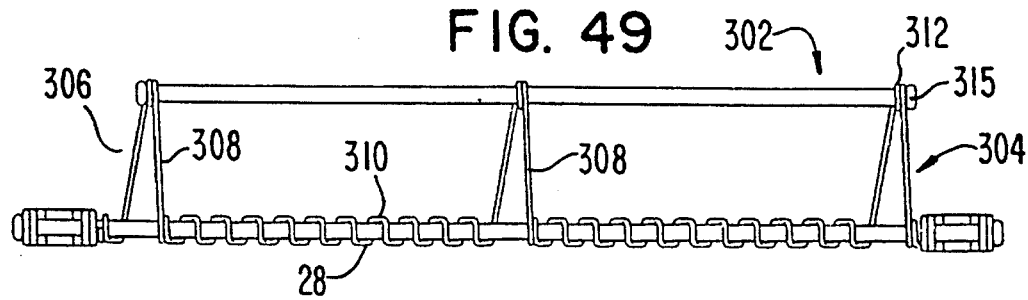
FIG. 49 is a front elevational view of a right-triangular version of the overlay of FIG. 44.
Figure 50:
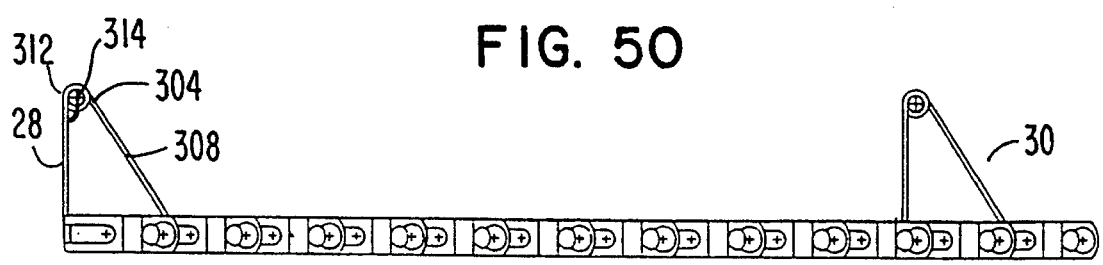
FIG. 50 is a side elevational view of the overlay of FIG. 49.

FIGS. 49 and 50 illustrate an overlay 302 comprising lifts 304 arranged intermittently on the conveying surface of the overlay which is a right-triangular version of overlay 286 shown in FIG. 44, and is made up of integral lift spirals 306, each individual lift spiral 306 having upstanding right-triangular portions 308, flat portions 310 and circular coil loops 312 integrally formed on the upstanding portions. The circular coil loops 312 are aligned horizontally across the overlay and receive lift rods 314 which extend across the overlay, and are disposed parallel to the conveying surface to provide added strength to the lifts 304. The ends of lift rods 314 are similarly finished with buttonheads 315 which retain the lift rods in the outermost coil loops adjacent the side edges of the overlay. Lift spirals 306 are arranged intermittently among flat helical spirals similar to flat spirals 300 of FIG. 44, which form the generally flat conveying surface.

Figure 51:
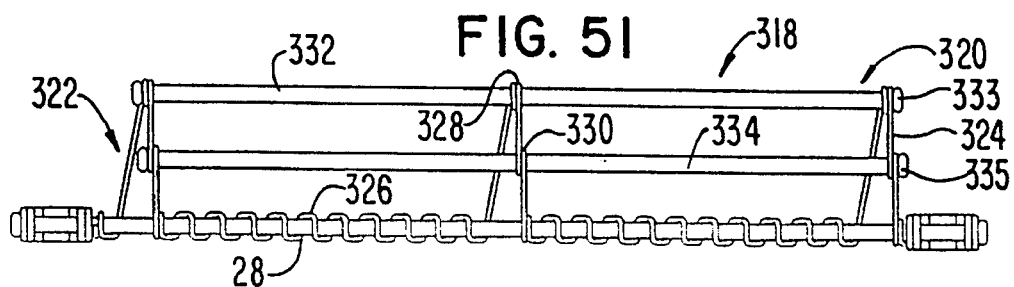
FIG. 51 is a front elevational view of an overlay section according to a tenth preferred embodiment of the present invention.
Figure 52:
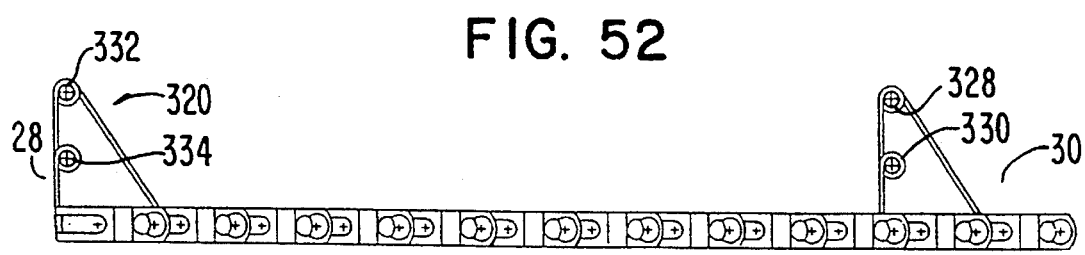
FIG. 52 is a side elevational view of the overlay of FIG. 51.

FIGS. 51–52 illustrate an overlay 318 according to a tenth preferred embodiment of the present invention comprising multiple rod lifts 320 arranged intermittently on the conveying surface of the overlay. Overlay 318 is a multiple rod lift version of overlay 302 shown in FIG. 49, and is substantially similar to overlay 302. Multiple rod lifts 320 comprise individual integral lift spirals 322 each having upstanding right-triangular portions 324 and flat portions 326. Each upstanding portion 324 has an integral topmost coil loop 328 and an integral coil loop 330 on the perpendicular leg of the right-triangle shape. The topmost coil loops 328 are aligned with one another horizontally across the overlay, and receive a top lift rod 332 finished with buttonheads 333 at its ends. Likewise, the leg coil loops 330 are aligned horizontally across the overlay, and receive a leg lift rod 334 finished with buttonhead 335 at its ends. Together, the top lift rod and leg lift rod form a multiple rod lift which provides rigidity and strength to the lift 320. Lift spirals 322 are arranged intermittently among flat helical spirals similar to flat spirals 300 of FIG. 44, which form the generally flat conveying surface.

FIGS. 53–58 illustrate modular overlay configurations similar to the rod lift embodiments of FIGS. 49 and 51. The following modular overlays, consistent with the above-described embodiments, have right-triangular upstanding elements.

FIGS. 53–56 illustrate overlay 338 according to a eleventh preferred embodiment of the present invention comprising rod lifts 340 arranged intermittently on the conveying surface of the overlay. Overlay 338 is a modular version of overlay 302 shown in FIG. 49, and each lift 340 comprises individual modular right-triangular spirals 342 and individual flat spirals 344 which form a lift base 346. The right-triangular spirals 342 have top coil loops 348 at their topmost bends. A lift rod 350 extends across the overlay in the transverse direction and is received in coil loops 348.

Figure 55:
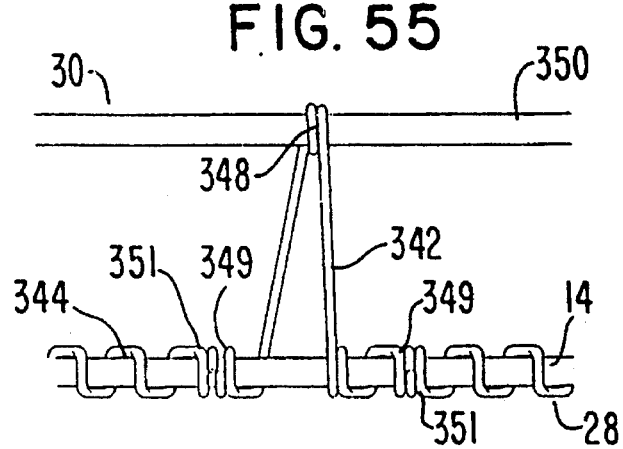
FIG. 55 is a detailed front elevational view of a central modular element of the overlay of FIG. 53.
Figure 56:
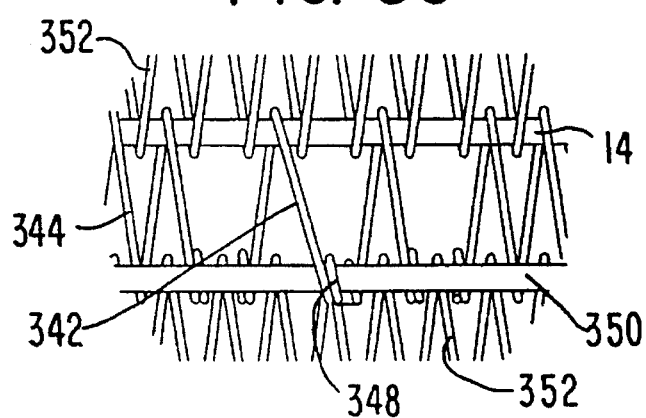
FIG. 56 is a detailed top plan view of two consecutive connecting rods and spirals surrounding a central modular element of the overlay of FIG. 53.

FIGS. 55 and 56 illustrate detailed views of one modular right-triangular spiral. FIG. 55 is a front view of one modular upstanding spiral 342 and its coil loop 348 receiving a portion of lift rod 350. The ends of spiral 342 are finished around rod 14 by pigtails 349, and similarly, the ends of spiral 344 near the upstanding spiral are finished around rod 14 by pigtails 351. FIG. 56 is a detailed top plan view of two overlay rods 14, being connected by spirals 342 and 344, with one of the overlay rods covered by lift rod 350. The intermeshed relationship of adjacent spirals is clearly shown in FIG. 56 where adjacent flat spiral 352 shares a rod 14 with modular upstanding spiral 342 and modular flat spiral 344. The spirals are free to collapse into one another about one of the rods 14, in this case the rods without pigtails 349 and 351.

Figure 53:
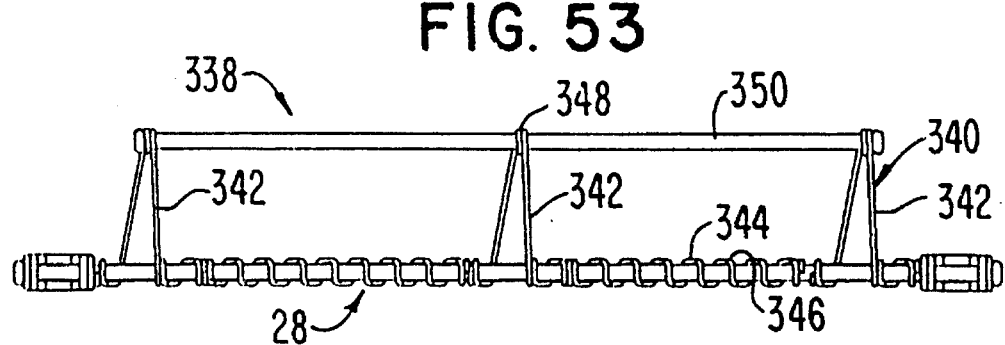
FIG. 53 is a front elevational view of an overlay section according to an eleventh preferred embodiment of the present invention.
Figure 54:
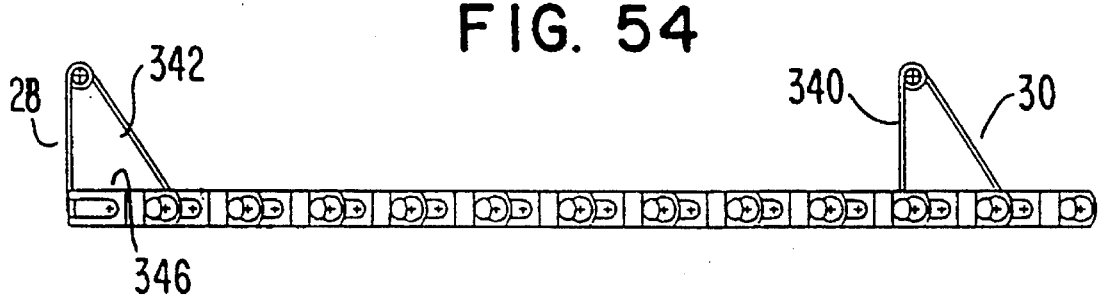
FIG. 54 is a side elevational view of the overlay of FIG. 53.
Figure 57:
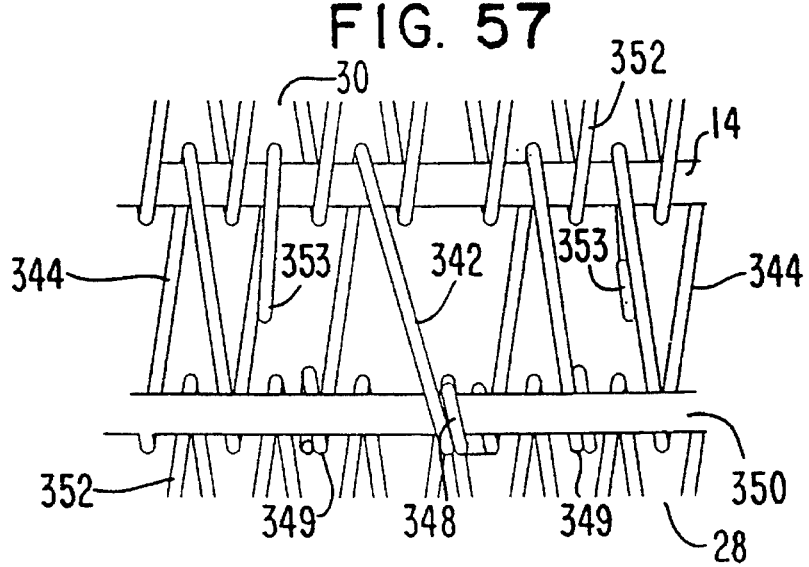
FIG. 57 is a detailed top plan view of two consecutive connecting rods and spirals surrounding a central modular element of an alternative embodiment of the overlay of FIG. 53.

FIG. 57 illustrates a detailed view of an overlay section similar to overlay 338 of FIG. 53, but with an extended pigtail 353 on the ends of flat spirals 344 near the upstanding spiral 342. Pigtail 353 is referred to as extended since it is located at the end of the spiral wire at a location extended away from the rod 14, rather than wrapped around the rod. Further description of extended pigtails and their advantages can be found with reference to FIGS. 83–86.

Figure 58:
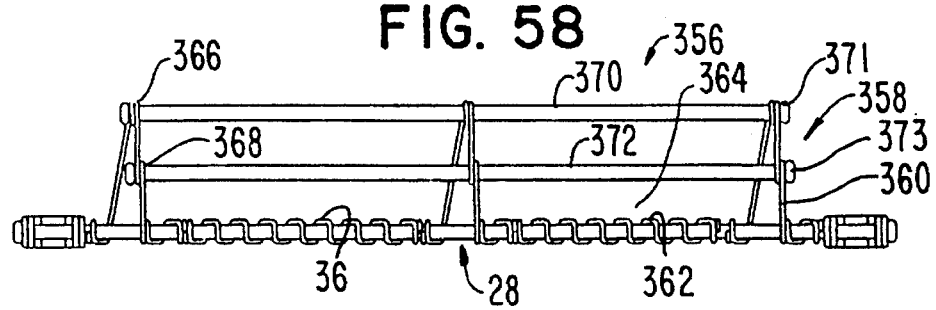
FIG. 58 is a front elevational view of a spiral overlay in accordance with a twelfth preferred embodiment of the present invention.
Figure 59:
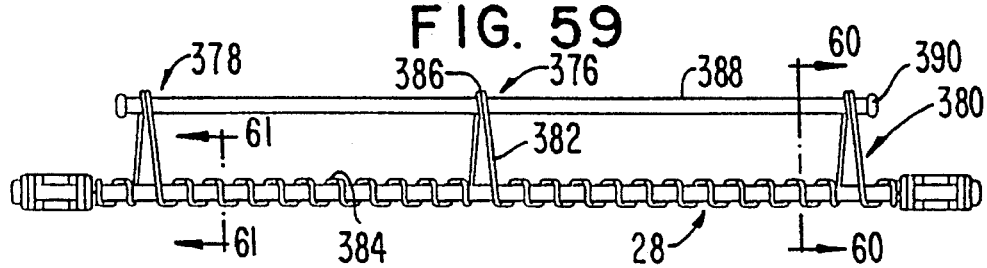
FIG. 59 is a front elevational view of a spiral overlay in accordance with a thirteenth preferred embodiment of the present invention.
Figure 62:
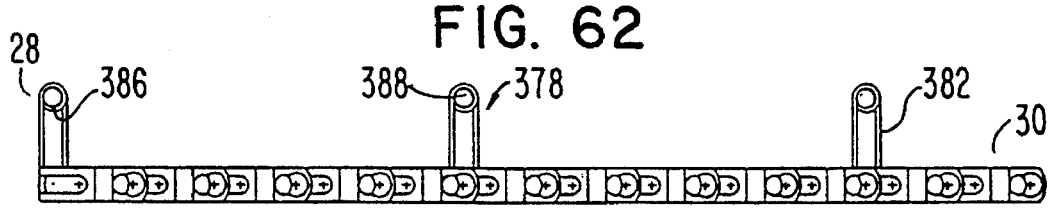
FIG. 62 is a side elevational view of the overlay of FIG. 59.

FIG. 58 illustrates overlay 356 according to a twelfth preferred embodiment of the present invention comprising multiple rod lifts 358 arranged intermittently on the conveying surface of the overlay. Overlay 356 is a modular version of overlay 318 shown in FIG. 51, and each lift 358 comprises individual modular right-triangular spirals 360 and individual flat spirals 362 which form a lift base 364. The right-triangular spirals 360 have top coil loops 366 at their topmost bends and leg coil loops along the perpendicular leg of the right-triangle shape. When the fight-triangular spirals 360 are aligned between a pair of overlay rods 14, the coil loops are horizontally aligned with the overlay. The top coil loops 366 receive a top lift rod 370, and similarly the leg coil loops 368 receive a leg lift rod 372. Rods 370 and 372 extend across the overlay 356 such that they are parallel to the overlay surface. The lift rods 370 and 372 are finished with buttonheads 371 and 373 respectively. Lifts 358 and lift bases 364 are arranged intermittently among flat helical spirals which traverse the entire width of the overlay and form the generally flat conveying surface, similar to flat spirals 300 of FIG. 44.

Figure 60:
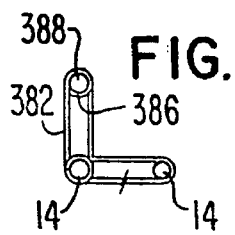
FIG. 60 is a cross-section of the overlay taken along line 60—60 of FIG. 59.
Figure 61:
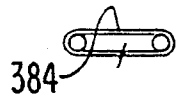
FIG. 61 is a cross-section of the overlay taken along line 61—61 of FIG. 59.

FIGS. 59–62 illustrate an overlay 376 according to a thirteenth preferred embodiment of the present invention comprising lifts 378 arranged intermittently on the conveying surface of the overlay. Overlay 376 is an upright, oblong or 90° lift version of overlay 286 shown in FIG. 44, and is made up of integral lift spirals 380, each individual lift spiral 380 having perpendicular upstanding portions 382, flat portions 384 and circular coil loops 386 integrally formed on the upstanding portions. The circular coil loops 386 are aligned horizontally across the overlay and receive lift rods 388 which extend across the overlay, and are disposed parallel to the conveying surface to provide added strength to the lifts 378. The ends of lift rods 388 are finished with buttonheads 390 which retain the lift rods in the outermost coil loops adjacent the side edges of the overlay. Lift spirals 380 are arranged intermittently among flat helical spirals similar to flat spirals 300 of FIG. 56. FIGS. 60 and 61 are cross-sections of lift spiral 380 which clearly shows the 90° relationship between the flat part of the overlay and the upstanding portions 382.

Figure 63:
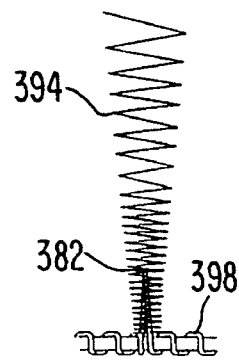
FIG. 63 is a detailed front elevational view of a tapped spiral mounted on an overlay having similar features to that shown in FIG. 59.
Figure 64:
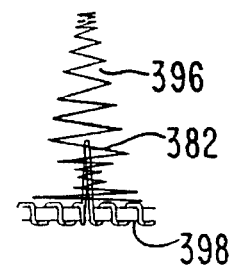
FIG. 64 is a detailed front elevational view of a tapped spiral mounted on an overlay having similar features to that shown in FIG. 59.
Figure 65:
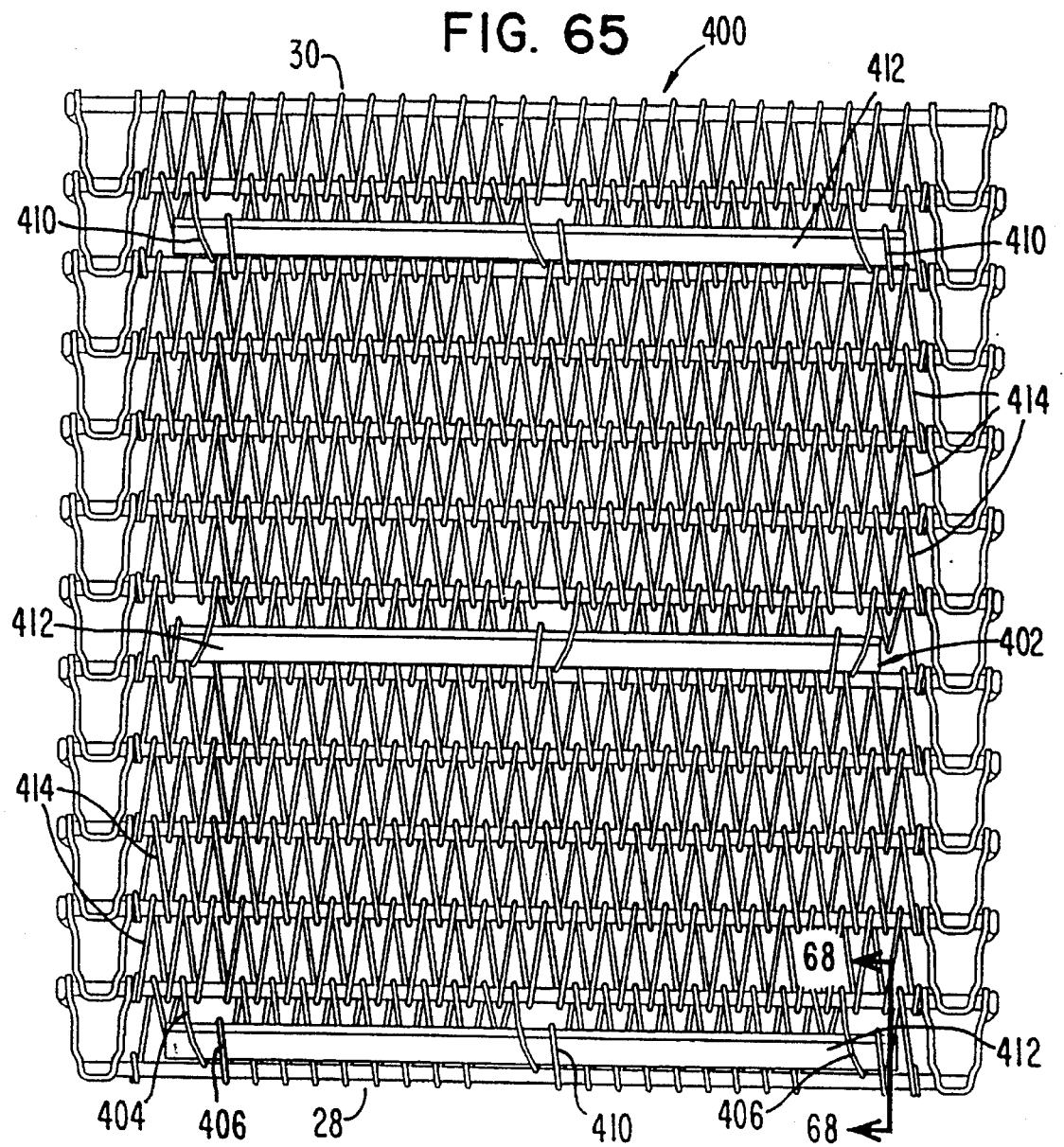
FIG. 65 is a top plan view of a spiral overlay section in accordance with a fourteenth preferred embodiment of the present invention.
Figure 71:
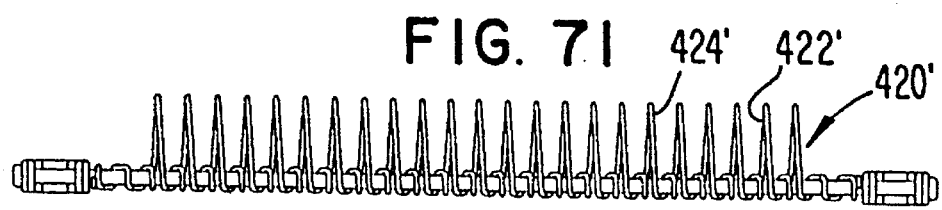
FIG. 71 is a cross-section of the overlay taken along line 71—71 of FIG. 69.
Figure 76:
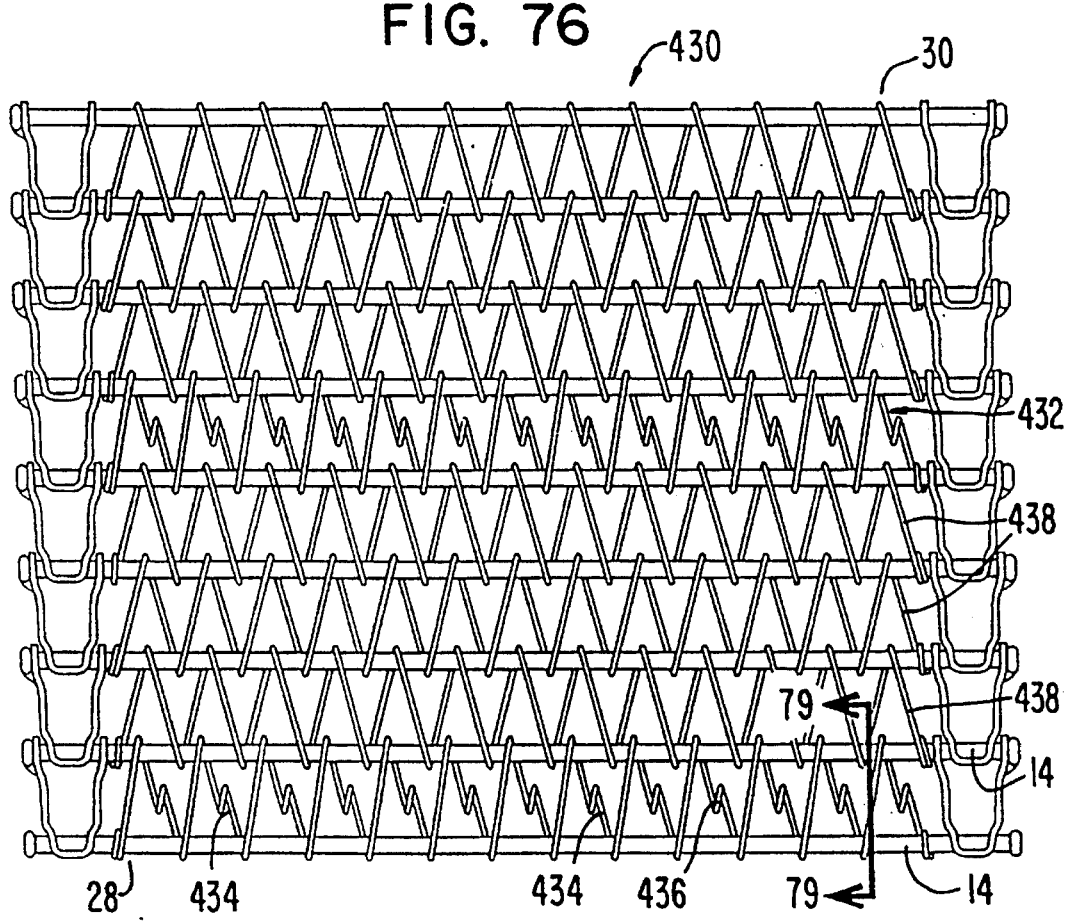
FIG. 76 is a top plan view of a wire-saver spiral overlay in accordance with a sixteenth preferred embodiment of the present invention.
Figure 77:
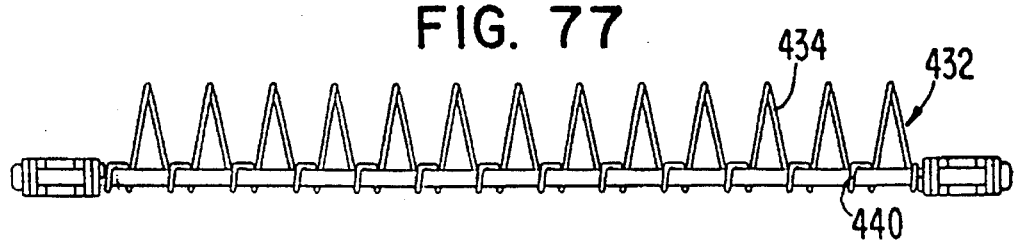
FIG. 77 is a front elevational view of the overlay of FIG. 76.

FIGS. 63 and 64 illustrate two examples of vertical spirals 394 and 396 respectively, which can be mounted over 90° upstanding portions 382 as shown in FIGS. 59–62. Spirals 394 and 396 are fixed to upstanding portions 382 in any suitable manner such as welding, adhesives, friction fitting or screwing with a tapped section as shown in the Figures. In order to most effectively utilize vertical spirals 394 and 396, the underlying spiral 398 having the upstanding portions 382 must have enough integrally formed upstanding portions 382 such that when vertical spirals are mounted thereto, a row of vertical spirals will effectively form a lift. In this regard, the underlying spiral described with reference to FIG. 71 may represent a desirable configuration for mounting vertical spirals. The lifts formed by using vertical spirals such as these will be more flexible than the heretofore described geometric lifts or rod lifts, both of which are more rigid. All other variables being similar, it will be apparent to one skilled in the art that a series of vertical, inverted frusto-conical spirals 394 mounted on a spiral 398 to form a lift will provide greater product support than right-side-up frusto-conical spirals 396 as in FIG. 64. These flexible lifts may be desired in handling lighter weight or particularly fragile articles. The preferred use for these flexible lifts is as individual article support, such as supports for light weight articles, e.g. ice cream cones.

FIGS. 65–75 illustrate additional overlay configurations made up integral spirals incorporating upstanding elements on the conveying surfaces thereof. In these embodiments the upstanding elements are bar lifts which comprise polygonal shapes which receive lift bars, thereby providing a sturdier and more rigid lift. Using rods or bars in conjunction with the spirals of the present invention entails a simple assembly step of inserting the rod or bar into the appropriate loops of the spiral. If more firm fixation is required the rod or bar can be welded to the readily accessible portions of the spirals. This is in contrast to the type of attachment which was necessary with the prior art plates which had to be rigidly secured by screws, welding or the like to the rods or the links. Although only an equilateral triangular shape and a perpendicular oblong shape are shown, any polygonal shape is contemplated to be within the scope of the invention.

Figure 66:
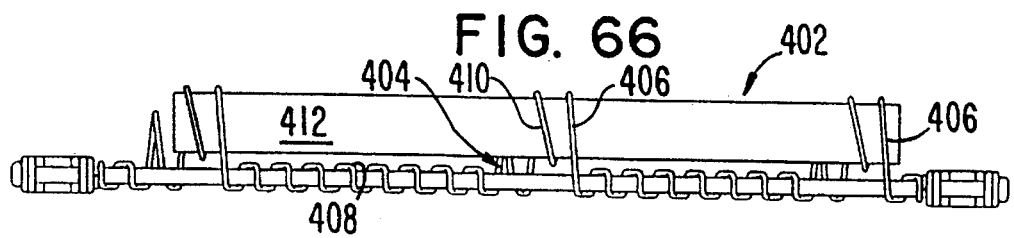
FIG. 66 is a front elevational view of the overlay of FIG. 65.
Figure 67:
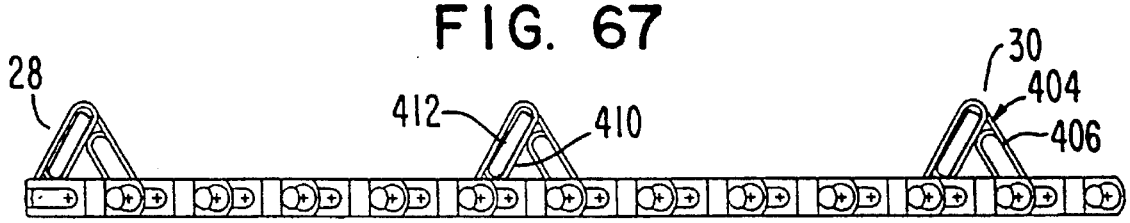
FIG. 67 is a side elevational view of the overlay of FIG. 65.
Figure 68:
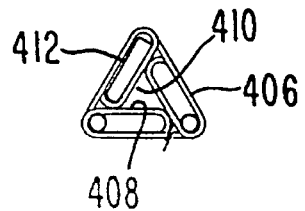
FIG. 68 is a cross-section of the overlay taken along line 68—68 of FIG. 65.
Figure 69:
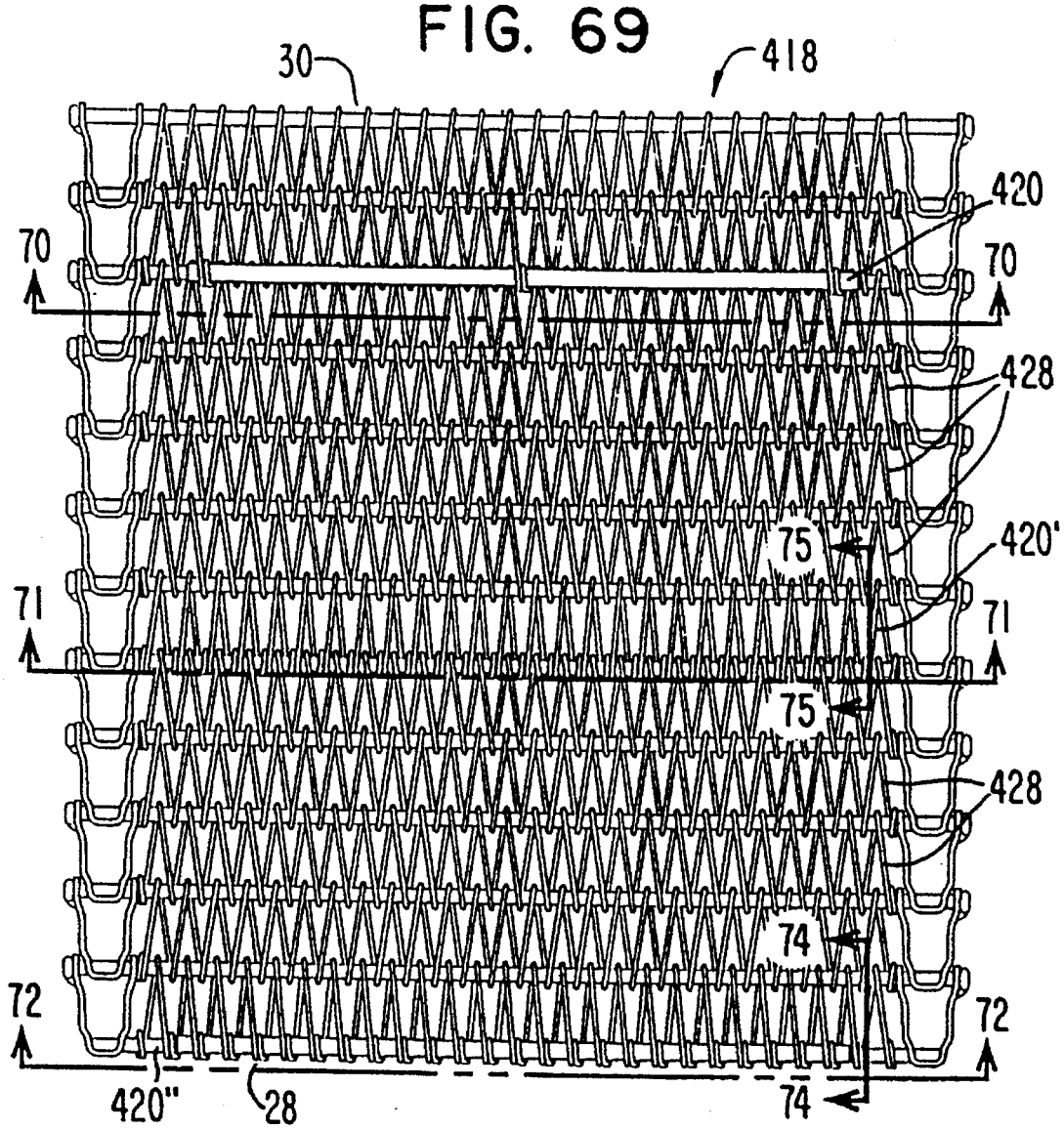
FIG. 69 is a top plan view of a spiral overlay section in accordance with a fifteenth preferred embodiment of the present invention.

FIGS. 65–68 illustrate an overlay 400 according to a fourteenth preferred embodiment of the present invention comprising equilateral triangular upstanding elements which form lifts 402, as seen in FIGS. 66 and 67, arranged intermittently on the conveying surface of the overlay. Overlay 400 is made up of integral lift spirals 404, each individual lift spiral having upstanding portions 406 and flat portions 408. The upstanding portions 406 include an elongated loop 410 sized to receive a relatively flat, rectangular bar 412 to thereby provide a lift 402. Bars 412 extend across the overlay in the transverse direction and are disposed parallel to the conveying surface of the overlay to provide added strength to the lifts 402. Lift spirals 404 are arranged intermittently among flat helical spirals 414 which form the generally flat conveying surface. FIG. 68 illustrates a cross-section of the upstanding portion 408 and bar 412.

Since the upstanding portions 406 of the lift spirals 404 are shaped as equilateral triangles, bar 412 when inserted into the loops 410, will be slanted relative to the perpendicular. If a right-triangular lift spiral is used, the loops and bar may be located either on the slanted leg of the triangle or the perpendicular leg of the triangle as desired. As will be apparent to one skilled in the art, the angle of the bar relative to the conveying surface of the overlay will affect the amount of traction supplied to the conveyed articles, and variables such as the type, shape and size of the articles to be carried may be used to determine the optimum configuration of the lift.

Figure 70:
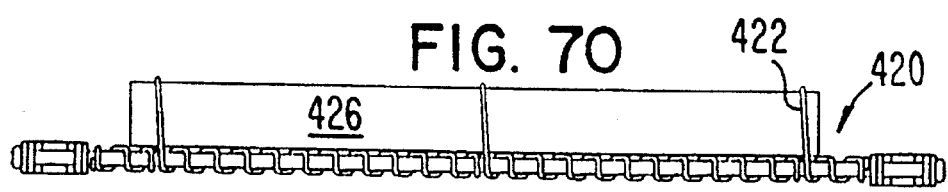
FIG. 70 is a front elevational view of the overlay of FIG. 69.

FIGS. 69–75 illustrate an overlay 418 according to a fifteenth preferred embodiment of the present invention comprising lifts 420 arranged intermittently on the conveying surface of the overlay. Overlay 418 is a 90° oblong version of overlay 400 shown in FIG. 65, and is made up of integral lift spirals 422, each individual lift spiral having upstanding portions 424 forming a lift 420. The upstanding portions 424 are preferably sized to receive a bar 426, which when inserted formed a perpendicular, shelf-like lift. For convenience of explanation, overlay 418 includes three variations of oblong lifts, lift 420 of FIG. 70, lift 420' of FIG. 71 and lift 420" of FIG. 72. Any combination of the different lifts may be used on a single overlay, or a single type of lift may be used. Lift 420 of FIG. 70 is most closely analogous to lift 402 of FIG. 65, as the upstanding portions 424 of the lift spiral 422 are located at the side edges and the center of the overlay. Lift 420' of FIG. 71 comprises a lift spiral 422' having a series of upstanding portions 424' which form the lift. Since, no bar is used in lift 420', it will result in a lighter weight overlay which may be used for conveying lighter or smaller articles. A lift of the type shown in FIG. 71 could also be used to mount vertical spirals thereon, such as those shown in FIG. 63 and 64. Lift 420" of FIG. 72 comprises a lift spiral 422" identical to the one illustrated in FIG. 71, but with a bar 426 inserted through the series of upstanding portions 424". Lift 420" of FIG. 72 will result in a relatively heavy overlay. Since the upstanding portions are perpendicular to the surface of the overlay, any bars 426 inserted into the upstanding portions will also be perpendicular unlike the embodiments which use triangular portions. Lift spirals 422 are arranged intermittently among flat helical spirals 428 which form the generally flat conveying surface. FIGS. 74 and 75 illustrate cross-sections of lift spirals 420' and 420".

Figure 79:
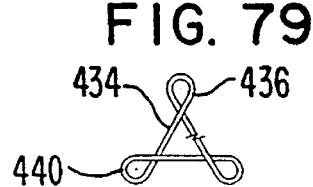
FIG. 79 is a cross-section of the overlay taken along line 79—79 of FIG. 76.

FIGS. 76–79 illustrate an overlay 430 according to a sixteenth preferred "wire-saver" embodiment of the present invention comprising lifts 432 arranged intermittently on the conveying surface of the overlay. Overlay 430 is a wire-saver version of overlay 40 of FIG. 5, and is made up of integral lift spirals 434, each individual lift spiral having upstanding looped portions 436. The upstanding portions 436 are aligned horizontally across the overlay to form lift 432. Lift spirals 434 are arranged intermittently among flat helical spirals 438 which form the generally flat conveying surface of the overlay. FIG. 79 illustrates a cross-section of a lift spiral 434 having base loops 440 which receive rods 14. Any collapsibility of the spirals relative to the rods will depend on the presence of any base loops and the sizes of any base loops in an elongated fashion. The relatively looser winding of the spirals and use of simple loops instead of coiled circular loops of overlay 430 results in more economical use of wire than in previous embodiments. Although not pictured, it is contemplated that the upstanding looped portions 436 may be sized to receive lift rods to form sturdier lifts similar to the embodiment shown in FIG. 44.

FIGS. 80–83 illustrate an alternate connective link embodiment from the link 20 pictured in the foregoing embodiments. Wire connective links 446 are modified wire spirals interconnecting rods 14. Links 446 are formed to include coiled pigtails 448 at the ends of the wire which are disposed at the leading side. In FIG. 80, the pigtails 448 are disposed to the trailing side 30. The opposite side, in this case the leading side, of the links 446 include an elongated loop 450 to contain the respective rods 14. The elongated loop 450 will accommodate collapsibility of adjacent spirals relative to the rods. With reference to FIGS. 4A–4C which illustrate the U-shaped connective links 20, the pigtails 448 are analogous in function to the circular aperture 21, and the elongated loops 450 are analogous in function to the slot 23 which allows rod 14 to move relative to the link, thereby allowing adjacent spirals to collapse or expand. FIG. 80 illustrates a partially assembled overlay pictured with portions of helical spirals 452 for illustrative purposes only. FIG. 81 is a front elevational view of a rod 14 having a wire link 446 at each end, and FIG. 82 is a side elevational view of a series of rods 14 interconnected by wire links 446. As will be apparent to one skilled in the art, use of wire links 446 will result in a lighter weight overlay, and may be more economical to manufacture since all components of the overlay except for the rods, may be formed of standard wire stock on one machine. A totally wire overlay may be desirable for certain applications involving lighter weight articles. The rods 14 are identical to the rods used with prior embodiments, and are finished with buttonheads 15 on their ends. Advantageously, any changes in the pitch of the belt are easily accommodated by simply forming the wire links of the desired pitch. In addition, since wire sizes can be changed for lighter or heavier loads, all aspects of the design of the overlay can be maximized, including cost, to the end use.

Figure 83:
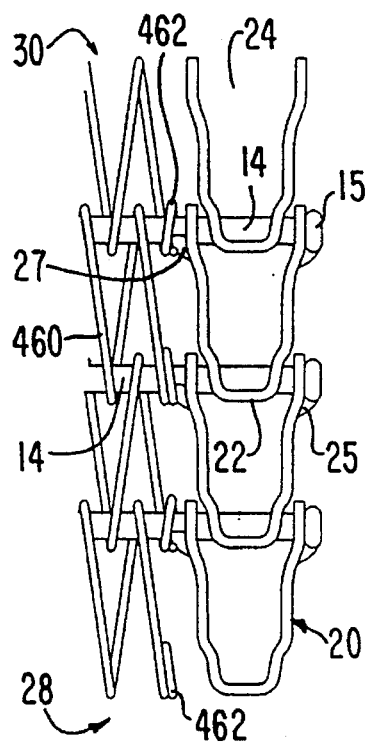
FIG. 83 is a detailed top plan view of a side of a spiral overlay having circular pigtails.

FIGS. 83–86 illustrate various embodiments of the pigtails used at the ends of the spirals near the connective links or wire links. Although FIGS. 83–86 are shown with connective links 20, it will be understood that wire links such as those shown in FIG. 80 or flat plate links could also be used. Reference is made to FIGS. 4A–4C and the same reference numerals will be used to denote the relevant features of the links and rods. Reference is also made to FIG. 57 which showed a detailed top plan view of an extended pigtail embodiment. FIG. 83 is a detailed view of spirals 460 connected by rods 14 and links 20. Spirals 460 have pigtails 462 at the ends which wrap around the rods 14. The rods 14 are fixed relative to the links 20 by welds 25 and 27 to the exterior and interior of the overlay respectively. Pigtails 462 of FIG. 83 are exemplary of most of the embodiments of the overlay described heretofore.

With certain overlay configurations, some problems have been experienced with circular pigtails of the type shown in FIG. 83. During use, as the spirals, rods and links of an overlay move relative to one another in conveying material, expanding and contracting to accommodate curves or turns, it has been found that the pigtails may tend to ride up onto the interior welds 27. The forces which cause circular pigtails to contact the weld heads 27 may be cyclic or random, but generally are repetitive and may be sufficient over time to cause the pigtails to cut a groove into the weld head and also causing the pigtails to break. In order to alleviate stress or fatigue failures, the pigtails shown in FIGS. 84–86 have been developed so as to clear or avoid contact with the weld heads 27.

Figure 84:
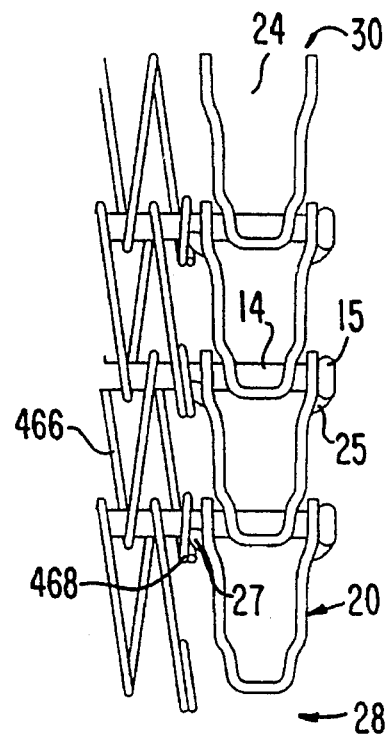
FIG. 84 is a detailed top plan view similar to FIG. 83 showing extended pigtails.

FIG. 84 illustrates a spiral 466 having a pigtail 468 which curves around rod 14, but is extended or enlarged toward the leading edge 28 of the overlay in order to provide some clearance between the pigtail 468 and the weld 27. This modification may be sufficient in some applications to prevent any stress problems associated with the pigtail and weld.

Figure 85:
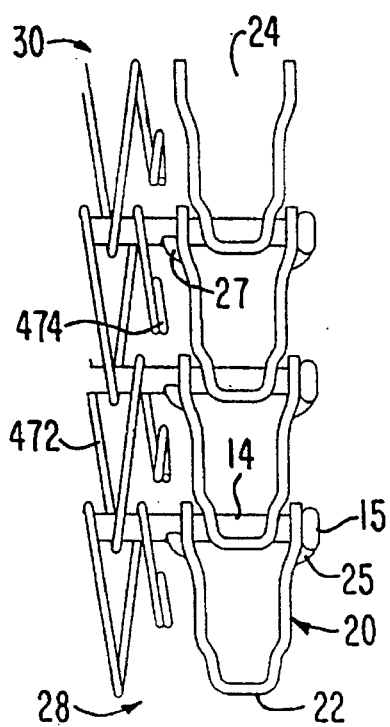
FIG. 85 is a detailed top plan view similar to FIG. 83 showing centered pigtails.

FIG. 85 illustrates a spiral 472 having a centered or extended pigtail 474 similar to the spiral shown in FIG. 57. The centered pigtail 474 eliminates the possibility of the weld 27 and the pigtail 474 making contact except perhaps during extreme contraction of the overlay, since it is not received about rod 14 but is located spaced from it. During normal use, pigtail 474 generally does not contact weld 27. The pigtail has finished edges to facilitate set up of the belt.

Figure 86:
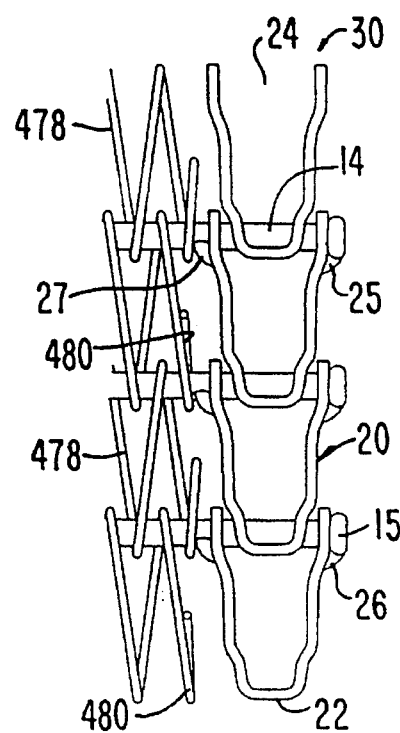
FIG. 86 is a detailed top plan view similar to FIG. 83 showing alternative extended pigtails.

FIG. 86 illustrates a spiral 478 having an extended pigtail 480 having a 270° revolution instead of a complete circular loop at the end. It is contemplated to be within the scope of the invention to use variations on the 270° revolution, such as a 360° revolution. Pigtail 480 is also elongated and extends rearward of the conveying direction. Pigtail 480 in most applications does not make contact with the weld 27 so as to avoid the possibility of failure.

Although the various modifications of the pigtails have been described separately from the general description of the overlay, it will be understood that any of the above-described pigtails, or modifications thereof may be used on any overlay configuration at any point, such as the ends of the spirals near the links, or at any point along the width of the overlay at the junctures of modular spirals.

The spiral overlay of the present invention, in any of its embodiments, employs a conventional drive system with the connective links 20 serving as tractive links which can engage a sprocket or an idler pulley. The overlay of the present invention is therefore, readily adaptable for use on existing conveyor systems by simply replacing an existing overlay with the spiral overlay of the present invention. Components of the overlay/belt such as the connective links and rods are of conventional design. The spiral overlay of the present invention can also be used in spiral conveying systems of the type disclosed in U.S. Pat. No. 4,940,133.

Any of the above-described rod lift embodiments could also incorporate lane dividers if instead of flat spirals between the lifts, integral spirals having upstanding elements or modular spirals alternating between flat and upstanding were used. In this way, overlays with rod lifts could be converted to those with pockets of conveying area if one or more lane dividers are added using any of the aforementioned arrangements of spirals.

The wire spirals of the present invention can be formed on CNC spring coilers or wire forming machines such as available through BHS-Torin, Inc. of Farmington, Conn.; Automated Industrial Motion of Muskegon, Mich. and Simplex Rapid of Milan, Italy.

Although the present invention has been illustrated in terms of preferred embodiments, it will be evident that numerous changes, adaptations, and modifications may be made without departing from the scope of the invention which is to be limited only by the appended claims.

I claim:

1. A conveyor belt having an upper conveying surface, a lower surface and side edges, said belt comprising:

a plurality of connecting rods extending laterally across said belt;

a spiral overlay comprising a plurality of wire spirals each forming a helix extending across said belt, each of said spirals comprising opposed arcuate linking bends at locations across each said spiral, said spirals arranged relative to one another such that said linking bends are intermeshed with linking bends of an immediately adjacent one of said spirals and said intermeshed linking bends of adjacent spirals receive one of said rods to operatively connect said spirals; and a plurality of connective links arranged at the ends of said spirals for operatively connecting said rods, said links being attached to said rods by welds adjacent the ends of said spirals and the ends of said spirals being formed so as to provide a clearance between said welds and the ends of said spirals.

2. The conveyor belt of claim 1 wherein the ends of said spirals are finished with loops adapted to receive said rods and said loops are extended so as to provide said clearance.

3. The conveyor belt of claim 1, wherein the ends of said spirals are disposed between adjacent ones of said rods and are spaced out of contact with said welds.

4. The conveyor belt of claim 3, wherein closed loops are formed on the ends of said spirals.

5. The conveyor belt of claim 1, wherein said wire spirals are formed of high tensile metal wire.

6. The conveyor belt of claim 3, wherein closed loops are integrally formed on at least a portion of said linking bends such that said closed loops are intermeshed with linking bends of an immediately adjacent one of said spirals and receive one of said rods.

7. The conveyor belt of claim 6, wherein said closed loops are formed on one of a leading side and a trailing side of said spirals.

8. The conveyor belt of claim 7, wherein said closed loops are formed at said leading side of spirals.

9. A spiral overlay for a conveyor belt formed of a plurality of connecting rods extending laterally across the belt, the belt having an upper conveying surface, a lower surface and side edges, said overlay comprising:

a plurality of wire spirals, each forming a generally flat helix extending across the belt, each of said spirals including opposed arcuate linking bends at locations across each said spiral, each said spiral defining a leading side and a trailing side, said spirals arranged relative to one another such that said linking bends are intermeshed with linking bends of an immediately adjacent one of said spirals, and said intermeshed linking bends of adjacent spirals adapted to receive one of the rods to operatively connect said spirals;

a plurality of integral pigtail loops formed on one of said leading and trailing sides of each of said spirals, with at least one of said loops provided in a central portion of each of said spirals so as to intermesh with linking bends of an adjacent spiral and to positively engage the rods received therein.

10. The spiral overlay of claim 9, wherein said integral pigtails are formed on said leading side of each of said spirals such that said trailing sides of each of said spirals are unlooped and free to collapse relative to adjacent spirals.

11. The spiral overlay of claim 10, wherein the ends of said spirals are finished with integral end pigtail loops adapted to receive said rods and extended so as to provide clearance between the ends of said spirals and said rods.

12. The spiral overlay of claim 10, wherein the ends of said spirals are finished with integral end pigtail loops extended to be disposed between adjacent ones of said rods so as to provide clearance between the ends of said spirals and said rods.

13. A conveyor belt having an upper conveying surface, a lower surface and side edges, said belt comprising:

a plurality of connecting rods extending laterally across said belt;

a spiral overlay comprising a plurality of wire spirals, each forming a generally flat helix extending across the belt, each of said spirals including opposed arcuate linking bends at locations across each said spiral, each said spiral defining a leading side and a trailing side, said spirals arranged relative to one another such that said linking bends are intermeshed with linking bends of an immediately adjacent one of said spirals, and said intermeshed linking bends of adjacent spirals adapted to receive one of the rods to operatively connect said spirals;

a plurality of integral pigtail loops formed on one of said leading and trailing sides of each of said spirals, with at least one of said loops provided in a central portion of each of said spirals so as to intermesh with linking bends of an adjacent spiral and to positively engage the rods received therein.

14. The conveyor belt of claim 13, further comprising a plurality of connective links arranged at the ends of said spirals for operatively connecting said rods, said links being attached to said rods by welds adjacent the ends of said spirals and the ends of said spirals being formed so as to provide a clearance between said welds and the ends of said spirals.

15. The conveyor belt of claim 14, wherein the ends of said spirals are finished with loops adapted to receive said rods and said loops are extended so as to provide said clearance.

16. The conveyor belt of claim 14, wherein the ends of said spirals are disposed between adjacent ones of said rods and are spaced out of contact with said welds.

17. The conveyor belt of claim 14, wherein closed loops are formed on the ends of said spirals.

18. The conveyor belt of claim 13, wherein said integral pigtail loops are closed loops.

19. The conveyor belt of claim 18, wherein said closed loops are formed on one of a leading side and a trailing side of said spirals.

20. The conveyor belt of claim 18, wherein said closed loops are formed at said leading side of spirals.

* * * * *